United States Patent
DeJarnette et al.

(10) Patent No.: US 11,137,765 B2
(45) Date of Patent: Oct. 5, 2021

(54) SMART ITEM STORAGE CART SYSTEM

(71) Applicant: Walmart Apollo, LLC, Bentonville, AR (US)

(72) Inventors: Ryan DeJarnette, Fayetteville, AR (US); Matthew Kelly, Bella Vista, AR (US); Jeffrey Green, Bentonville, AR (US)

(73) Assignee: Walmart Apollo, LLC, Bentonville, AR (US)

( * ) Notice: Subject to any disclaimer, the term of this patent is extended or adjusted under 35 U.S.C. 154(b) by 424 days.

(21) Appl. No.: 16/370,984

(22) Filed: Mar. 30, 2019

(65) Prior Publication Data

US 2019/0310646 A1 Oct. 10, 2019

Related U.S. Application Data

(60) Provisional application No. 62/652,852, filed on Apr. 4, 2018.

(51) Int. Cl.
*G05D 1/02* (2020.01)
*H04W 4/021* (2018.01)
(Continued)

(52) U.S. Cl.
CPC ......... *G05D 1/0214* (2013.01); *B65G 1/1375* (2013.01); *G05D 1/0246* (2013.01);
(Continued)

(58) Field of Classification Search
CPC .............. G05D 1/0214; G05D 1/0246; G05D 2201/0216; B65G 1/1375; B65G 1/00; H04W 4/38; H04W 4/021
(Continued)

(56) References Cited

U.S. PATENT DOCUMENTS 5,877,962 A 3/1999 Radcliffe
7,826,920 B2 11/2010 Stevens et al.
(Continued)

FOREIGN PATENT DOCUMENTS

JP 2010064823 A 3/2010
KR 20150137885 A * 12/2015

OTHER PUBLICATIONS

Young, Lee W., "International Search Report", International Application No. PCT/US2019/024642, Jul. 1, 2019, 2 pages.
(Continued)

*Primary Examiner* — Krishnan Ramesh

(57) ABSTRACT

Examples provide a stackable smart item storage cart. The cart includes a top member with a lip along its outer edge. A set of wheels, a directional wheel locking mechanism, and a set of four side members is connected to a base member. A vertical cavity passes through a center of the main body enclosing a memory, a processor, and a data storage. The cart smart item storage carts are stackable two-carts high with the wheels locked. A set of sensor devices monitor contents of a plurality of item storage bins on the cart. A bin indicator associated with an item storage bin activates to identify a bin and/or indicate a quantity of items to be removed from the bin. A timer device monitors a cart dwell-time. A self-navigation system may return the cart to a temperature-controlled area if the dwell-time exceeds a threshold time.

20 Claims, 18 Drawing Sheets

(51) Int. Cl.
*H04W 4/38* (2018.01)
*B65G 1/137* (2006.01)

(52) U.S. Cl.
CPC ............ *H04W 4/021* (2013.01); *H04W 4/38* (2018.02); *G05D 2201/0216* (2013.01)

(58) Field of Classification Search
USPC .......................................................... 701/25
See application file for complete search history.

(56) References Cited

U.S. PATENT DOCUMENTS

| | | | |
|---|---|---|---|
| 8,983,647 B1* | 3/2015 | Dwarakanath | G05D 1/0217 |
| | | | 700/216 |
| 9,008,827 B1* | 4/2015 | Dwarakanath | A47F 3/0482 |
| | | | 700/216 |
| 9,076,122 B2 | 7/2015 | Hoshino | |
| 9,254,959 B2 | 2/2016 | Janton | |
| 9,443,222 B2 | 9/2016 | Singel et al. | |
| 9,834,380 B2 | 12/2017 | Hamilton et al. | |
| 2004/0100380 A1 | 5/2004 | Lindsay et al. | |
| 2016/0176636 A1 | 6/2016 | Kazama et al. | |
| 2017/0330144 A1 | 11/2017 | Wakim et al. | |
| 2018/0043547 A1 | 2/2018 | Hance et al. | |
| 2019/0060892 A1* | 2/2019 | Davidowitz | B01L 3/545 |

OTHER PUBLICATIONS

Young, Lee W., "Written Opinion", International Application No. PCT/US2019/024642, Jul. 1, 2019, 5 pages.

\* cited by examiner

SMART ITEM STORAGE CART SYSTEM

BACKGROUND

Produce and other perishable items are typically shipped from a distribution center to a store on pallets in refrigerated trucks. When the pallets arrive at the store, store personnel break the pallet apart and place the various items in bins or containers in a refrigerated area in a storage area until they are needed to restock a display area in the produce department or other area on the sales floor of the store. The personnel may also have to manually scan each item removed from the pallet to update the store's inventory. When the items are needed for restocking, those items may be retrieved from the storage area and placed in a cart or basket for transport to the display area. Upon arrival at the correct display area, the store personnel use the retrieved items to manually restock shelves, side counters or refrigerated cases. This is frequently a long, time-consuming, inefficient and cumbersome process.

SUMMARY

Some examples provide a smart item storage cart. A main body includes a top member, a base member, a set of four side members; and a vertical cavity passing through a center of the main body. The vertical cavity encloses a memory and at least one processor communicatively coupled to the memory. One or more horizontal compartment within the main body encloses one or more item storage bins. A bin indicator device associated with an item storage bin activates to indicate a quantity of the contents of an item storage bin scheduled to be removed from the item storage bin and placed on an item display assigned to the instances of the item in the item storage bin. A data storage device stores an inventory of items located within the item storage bin. A cart location device identifies a location of the smart item storage cart within the item selection area. A timer device monitors a dwell-time based on the location of the smart item storage cart. The dwell-time includes an amount of time the smart item storage cart remains outside a temperature-controlled area. An output device generates a first alert recommending return of the stackable item storage cart to the temperature-controlled area on condition the dwell-time exceeds a first per-item maximum dwell-time. The output device that outputs a second alert recommending disposal of a set of items on the stackable item storage cart on condition the dwell-time exceeds a second per-item maximum dwell-time. An update component updates the inventory of items on the data storage device in response to addition of at least one item to the at least one item storage bin or removal of at least one item from the at least one item storage bin.

Other examples provide a stackable item storage cart. The item storage cart includes a main body comprising a top member, a base member, a set of side members; and a plurality of item storage bins. A set of four wheels attach to a bottom surface of the base member. A lip extends upward along an outer edge of the top member. A set of directional wheel locks associated with the set of four wheels are configured to lock the set of four wheels in a locked configuration for stacking a first item storage cart on top of a second item storage cart. A set of bin indicator devices associated with each bin in the plurality of item storage bins activate to identify a quantity of items within a selected bin designated for removal from the stackable item storage cart for placement on an item display in an item display area assigned to the at least one item in the selected bin. A power source is located within a central cavity of the main body. The power source is connected to each bin indicator device in the set of bin indicator device via a set of wires connecting the power source to the set of bin indicator devices. A timer device monitors a dwell-time the stackable item storage cart remains outside a temperature-controlled area. A user interface device outputs a first alert recommending return of the stackable item storage cart to the temperature-controlled area on condition the dwell-time exceeds a first per-item maximum dwell-time. The user interface device outputs a second alert recommending disposal of a set of items on the stackable item storage cart on condition the dwell-time exceeds a second per-item maximum dwell-time.

Still other examples provide a self-propelled item storage cart. The self-propelled item storage cart includes a main body comprising a top member, a base member, a set of four side members, a plurality of item storage bins and a vertical cavity passing through a center of the main body enclosing a memory and at least one processor communicatively coupled to the memory. The self-propelled item storage cart includes a plurality of bin indicator devices associated with the plurality of item storage bins. Each bin indicator device is associated with a corresponding item storage bin in the plurality of item storage bins. A bin indicator device activates to indicate a selected item storage bin. The plurality of bin indicator devices includes at least one partial bin restock indicator associated with at least one bin in the plurality of item storage bins. The at least one bin includes a plurality of instances of a selected item. The partial bin restock indicator identifies a quantity of the plurality of instances of the selected item to be removed from the at least one bin. A power source is located within a central cavity of the main body. The power source is connected to each bin indicator device in the plurality of bin indicator devices via a set of wires connecting the power source to the set of bin indicator devices. A motor is coupled to a set of wheels associated with a bottom surface of the base member. The set of wheels includes a braking system. A navigational autonomously returns the smart item storage cart to a temperature-controlled area on condition the smart item storage cart is located outside the temperature-controlled area for a per-cart threshold dwell time.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

Corresponding reference characters indicate corresponding parts throughout the drawings.

DETAILED DESCRIPTION

Figure 1:
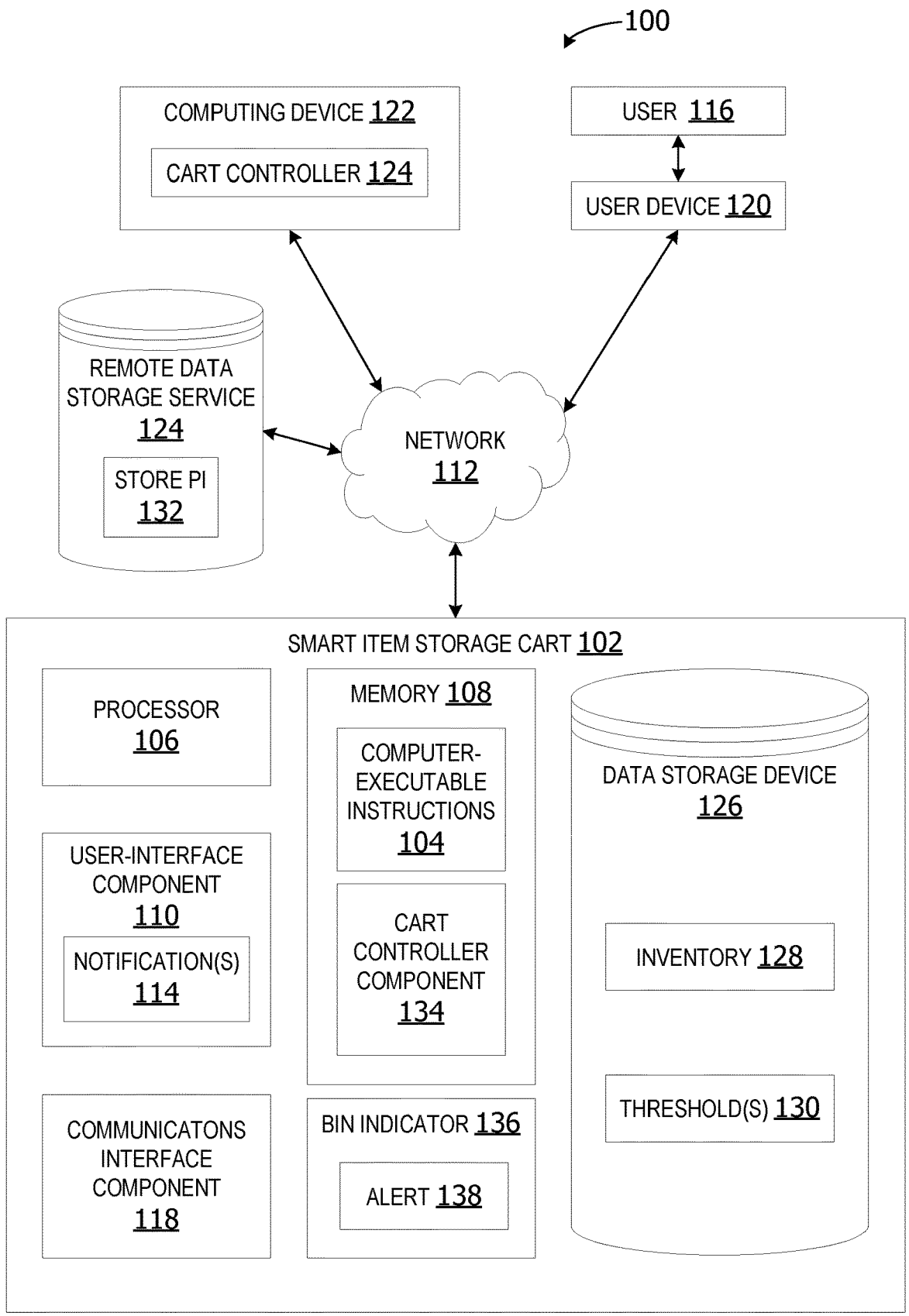
FIG. 1 is an exemplary block diagram illustrating a system for cold-chain compliant item storage carts.

Referring to the figures, examples of the disclosure enable a smart item storage cart. In some examples, the cart includes a bin indicator device that is activated to indicate a selected bin, a type of item to place into an empty bin, a quantity of instances of items to remove from a bin, provide cold-chain warnings/notifications, and/or output instructions to a user. This improves user efficiency and quality of items delivered via the smart item storage carts.

The smart item storage cart further enables self-navigation and automated inventory updates via analysis of sensor data and detection of geofences. This further reduces time and costs associated with ordering and restocking items at a store or other retail location.

In some examples, a restock manager component activates a bin restock indicator on a bin of the item storage cart to indicate removal of at least a portion of the items from the bin for restocking an item display. The bin restock indicator indicates which items to remove from the cart, a quantity of the items to remove from the cart for restocking, and cold-chain compliance for each item on the cart. In this manner, the indicator efficiently provides relevant information to users in a timely manner when the information is needed.

In other examples, the restock manager component activates the bin restock indicator to indicate where a user should place items that are being loaded onto the cart. A bin restock indicator for a selected bin is activated to identify the selected bin in which items should be placed, a quantity of items to place on the bin, and/or cold-chain requirements associated with the item.

A location monitor component in some examples detects the smart storage cart exiting a first geofence area and entering a second geofence area associated with at least one display area within the item selection area assigned to the selected item. This location monitor identifies a time at which the cart leaves the first geofence area and enters the second geofence area for cold-chain compliance purposes. The amount of time between leaving a temperature-controlled first geofence area and returning to the first geofence area is the dwell-time for the items on the cart. The dwell-time is the amount of time a perishable item spends outside a refrigerated or freezer area. This provides more accurate dwell-time calculation for cold-chain compliance.

Other examples provide an update component that automatically updates the PI for an item storage cart to reflect removal of one or more items from the cart in response to removal for the cart from the second geofence area for a minimum threshold restocking time and returned to the first geofence area within a maximum per-cart dwell time. In this manner, the system automatically maintains a more accurate cart inventory and store inventory without user intervention.

A cold-chain compliance component is provided in other examples that outputs a first alert recommending return of the smart storage cart to a temperature-controlled (refrigerated) area if the cart's dwell time outside the temperature-controlled area exceeds a maximum dwell-time threshold for at least one item on the cart. This improves cold-chain compliance and reduces loss of items due to excessive time outside temperature-controlled areas.

Referring again to FIG. 1, an exemplary block diagram illustrates a system 100 for cold-chain compliant item storage carts. In the example of FIG. 1, a smart item storage cart 102 is a cart for storing cold-chain compliant items. Cold-chain compliant items are perishable items which require storage at a given temperature or temperature range to prevent spoilage. The items stored on the cart may include, without limitation, produce, meat, dairy items, frozen food items, or any other temperature-dependent items.

The smart item storage cart 102 includes an integrated computing device for executing computer-executable instructions 104 (e.g., as application programs, operating system functionality, or both) to implement the operations and functionality associated with the smart item storage cart 102. The smart item storage cart 102 includes at least one processor 106 and a memory 108. The smart item storage cart 102 may also include a user interface component 110.

The processor 106 includes any quantity of processing units and is programmed to execute the computer-executable instructions 104. The computer-executable instructions 104 may be performed by the processor 106 or by multiple processors within the smart item storage cart 102 or performed by a processor external to the smart item storage cart 102. In some examples, the processor 106 is programmed to execute instructions such as those illustrated in the figures (e.g., FIG. 21 and FIG. 22).

The smart item storage cart 102 further has one or more computer-readable media such as the memory 108. The memory 108 includes any quantity of media associated with or accessible by the processor 106. The memory 108 may be internal to the smart item storage cart 102 (as shown in FIG. 1), external to the smart item storage cart (not shown), or both (not shown).

The memory 108 stores data, such as one or more applications. The applications, when executed by the processor 106, operate to perform functionality on the smart item storage cart 102. The applications may communicate with counterpart applications or services such as web services accessible via a network 112. For example, the applications may represent downloaded client-side applications that correspond to server-side services executing in a cloud.

In other examples, the user interface component 110 includes a graphics card for displaying data to a user 116 and receiving data from the user. In some examples, the user interface component 110 outputs notification(s) 114 to the user 116. The output notification(s) 114 may include a return cart notification output to the user on condition a first per-cart wait time expires prior to removal of the smart storage cart 102 from a non-temperature-controlled area within the item selection area. In another example, the notification(s) 114 may include a disposal notification output to the user if a second per-cart wait time expires before the smart item storage cart 102 is removed from the non-temperature-controlled area within the item selection area. The notification(s) 114 in other examples includes a maintenance alert which is output by the user interface on condition the internal temperature of at least one bin in the smart item storage cart 102 is outside an acceptable threshold temperature range.

The user interface component 110 may also include computer-executable instructions (e.g., a driver) for operating the graphics card. Further, the user interface component 110 may include a display (e.g., a touch screen display or natural user interface) and/or computer-executable instructions (e.g., a driver) for operating the display. The user interface component 110 may also include one or more of the following to provide data to the user 116 or receive data from the user: speakers, a sound card, a camera, a microphone, a vibration motor, one or more accelerometers, a BLUETOOTH® brand communication module, global positioning system (GPS) hardware, and a photoreceptive light sensor.

The network 112 is implemented by one or more physical network components, such as, but without limitation, routers, switches, network interface cards (NICs), and other network devices. The network 112 may be any type of network for enabling communications with remote computing devices, such as, but not limited to, a local area network (LAN), a subnet, a wide area network (WAN), a wireless (Wi-Fi) network, or any other type of network. In this example, the network 112 is a WAN, such as the Internet. However, in other examples, the network 112 may be a local or private LAN.

In some examples, the system 100 optionally includes a communications interface component 118. The communications interface component 118 includes a network interface card and/or computer-executable instructions (e.g., a driver) for operating the network interface card. Communication between the smart item storage cart 102 and other devices, such as but not limited to a user device 120, a computing device 122, and/or a remote data storage device 124, may occur using any protocol or mechanism over any wired or wireless connection. In some examples, the communications interface component 118 is operable with short range communication technologies such as by using near-field communication (NFC) tags.

In some examples, the communications interface component 118 is configured to output a return cart notification to the user device 120. The return cart notification may be output if a per-cart wait time expires before the user removes the smart storage cart 102 from a non-temperature-controlled geofence area within the item selection area.

The user device 120 represents any device executing computer-executable instructions. The user device 120 may be implemented as a mobile computing device, such as, but not limited to, a wearable computing device, a mobile telephone, laptop, tablet, computing pad, netbook, gaming device, and/or any other portable device. The user device 120 includes at least one processor and a memory. The user device 120 may also include a user interface component.

The computing device 122 is a device for executing computer-executable instructions. The computing device 122 may be a desktop computer, a server, or any other type of computing device. The computing device 122 in some non-limiting examples is executing a cart controller 124 for remotely controlling one or more functions of the smart item storage cart 102, such as, but not limited to, sensor devices, a navigation system, a braking system, an alert system, an output device or any other portion of the smart item storage cart.

The system 100 may optionally include a data storage device 126 for storing data, such as, but not limited to an inventory 128 of the contents of the smart item storage cart 102 and/or threshold(s) 130. The data storage device 126 may include one or more different types of data storage devices, such as, for example, one or more rotating disks drives, one or more solid state drives (SSDs), and/or any other type of data storage device. The data storage device 126 in some non-limiting examples includes a redundant array of independent disks (RAID) array. In other examples, the data storage device 126 includes a database.

The data storage device 126 in this example is included within the smart item storage cart 102 or associated with the smart item storage cart 102. In other examples, the system 100 includes a remote data storage device 124 accessed by the smart item storage cart via the network 112. The remote data storage device 124 may include a data storage device associated with a store, a data storage in a remote data center, or a cloud storage. The remote data storage device 124 in this non-limiting example includes a store perpetual inventory (PI) 132.

The memory 108 in some examples stores one or more computer-executable components. Exemplary components include a cart controller component 134. The cart controller component 134 detects an item storage cart exiting a temperature-controlled area. The cart controller component 134 monitors a dwell-time for the cart. The dwell-time is the amount of time occurring after the smart item storage cart 102 exits the temperature-controlled area and a return time when the smart item storage cart 102 returns to the temperature-controlled area. A bin indicator 136 outputs an alert 138 if the dwell-time exceeds a per-cart maximum dwell-time before the cart returns to a temperature-controlled area. The alert 138 notifies the user 116 to return the smart item storage cart to the temperature-controlled area.

In other examples, the cart controller component 134 updates the inventory 128 of the smart item storage cart to reflect removal of one or more instances a selected item from at least one bin on the smart storage cart if the smart storage cart is removed from the temperature-controlled area for a minimum threshold restocking time and then returned to the temperature-controlled area within the per-cart maximum dwell-time.

Figure 2:
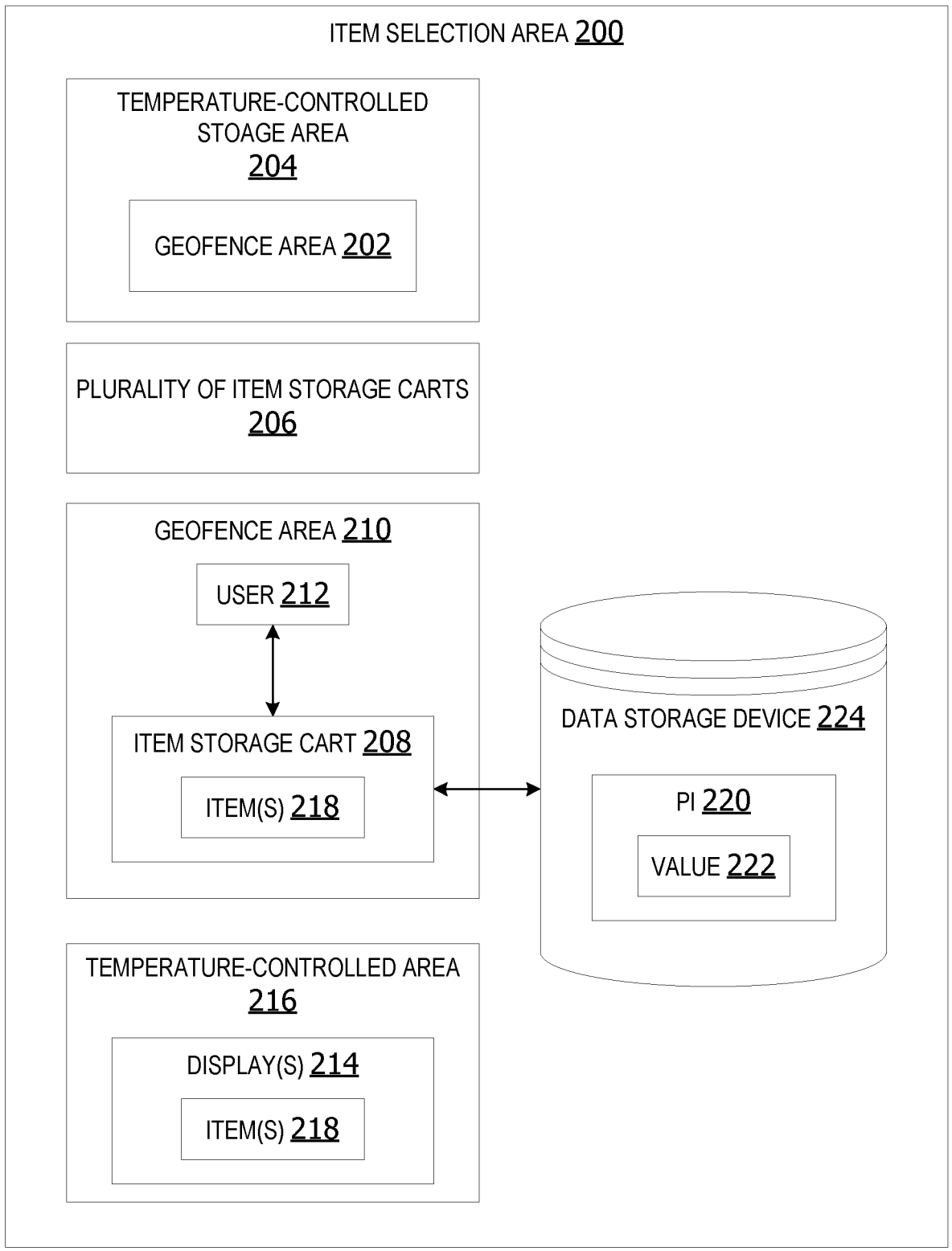
FIG. 2 is an exemplary block diagram illustrating an item selection area.

FIG. 2 is an exemplary block diagram illustrating an item selection area 200. The item selection area 200 includes a geo-fence area 202 within a temperature-controlled storage area 204 and a plurality of item storage carts. The temperature-controlled storage area 204 may include a refrigerated area or a freezer area in a backroom storage area. An item storage cart 208 in the plurality of item storage carts 206 is a cart for storing items, such as, but not limited to, the smart item storage cart 102 in FIG. 1.

The item storage cart 208 self-navigates out of the first geofence area 202 and enters a second geofence area 210. The item storage cart 208 waits in the second geofence area 210 until a user 212 moves the item storage cart 208 to one or more item display(s) 214 within a temperature-controlled storage area 216 on a sales floor area within the item selection area 200. The user 212 removes one or more item(s) 218 from the item storage cart 208 and places the item(s) 218 on the one or more item display(s) 214. The display(s) 214 may include, without limitation, a refrigerated case, a freezer case, a side-counter, a produce display, an end-cap display, shelves, or any other item display.

The item storage cart 208 updates a PI 220 value 222 representing inventory of the item(s) 218 within the item selection area 200. The PI 220 may be stored on a data storage device 224 located within the item selection area. The PI 220 may also be maintained on a storage located remotely from the item selection area 200.

Figure 3:
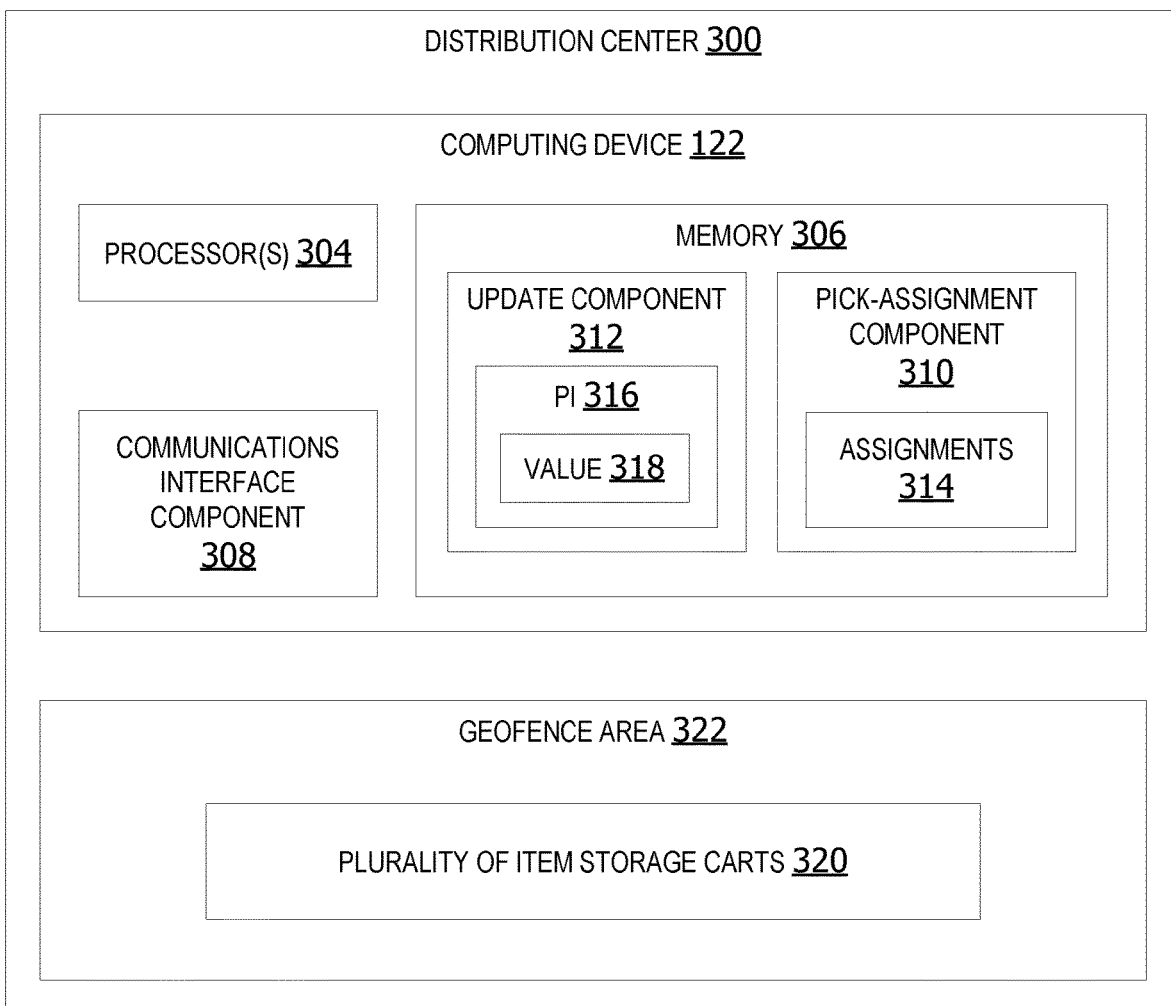
FIG. 3 is an exemplary block diagram illustrating a distribution center.

FIG. 3 is an exemplary block diagram illustrating a distribution center (DC) 300. The DC 300 may include a computing device 122. In some examples, the computing device 122 includes one or more processor(s) 304, a memory 306 and/or a communications interface component 308.

The memory stores components, such as, but not limited to, a pick-assignment component 310 and an update component 312. The pick-assignment component 310 generates assignments 314 of items to item storage bins on a smart item storage cart. The second update component 312 updates a PI 316 value 318 for the DC 300 to reflect removal of the items stored on the item storage cart from the plurality of item storage carts 320 on condition the item storage cart is detected exiting a geofence area 322 after stocking of the item storage cart is complete. A cart in the plurality of item storage carts 320 may include a cart, such as, but not limited to, the smart item storage cart 102 in FIG. 1 or the item storage cart 208 in FIG. 2.

Figure 4:
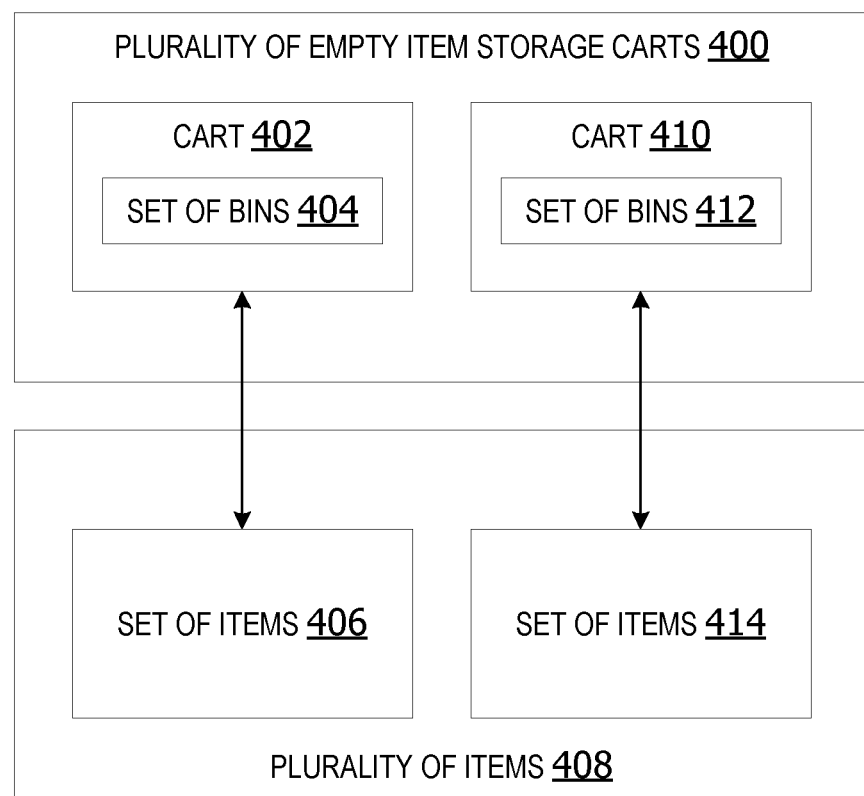
FIG. 4 is an exemplary block diagram illustrating a plurality of empty item storage carts.

FIG. 4 is an exemplary block diagram illustrating a plurality of empty item storage carts 400. A cart in the plurality of empty item storage carts 400 is a cart, such as, but not limited to, the smart item storage cart 102 in FIG. 1 or the item storage cart 208 in FIG. 2. Each cart in the plurality of empty item storage carts 400 includes one or more item storage bins. For example, cart 402 includes a set of one or more bins 404. A set of one or more items 406 in a plurality of items 408 are assigned to the set of bins 404. Likewise, the cart 410 includes a set of bins 412 assigned for storing a set of items 414. The set of items 414 may include multiple instances of a single item, as well as multiple different items.

Figure 5:
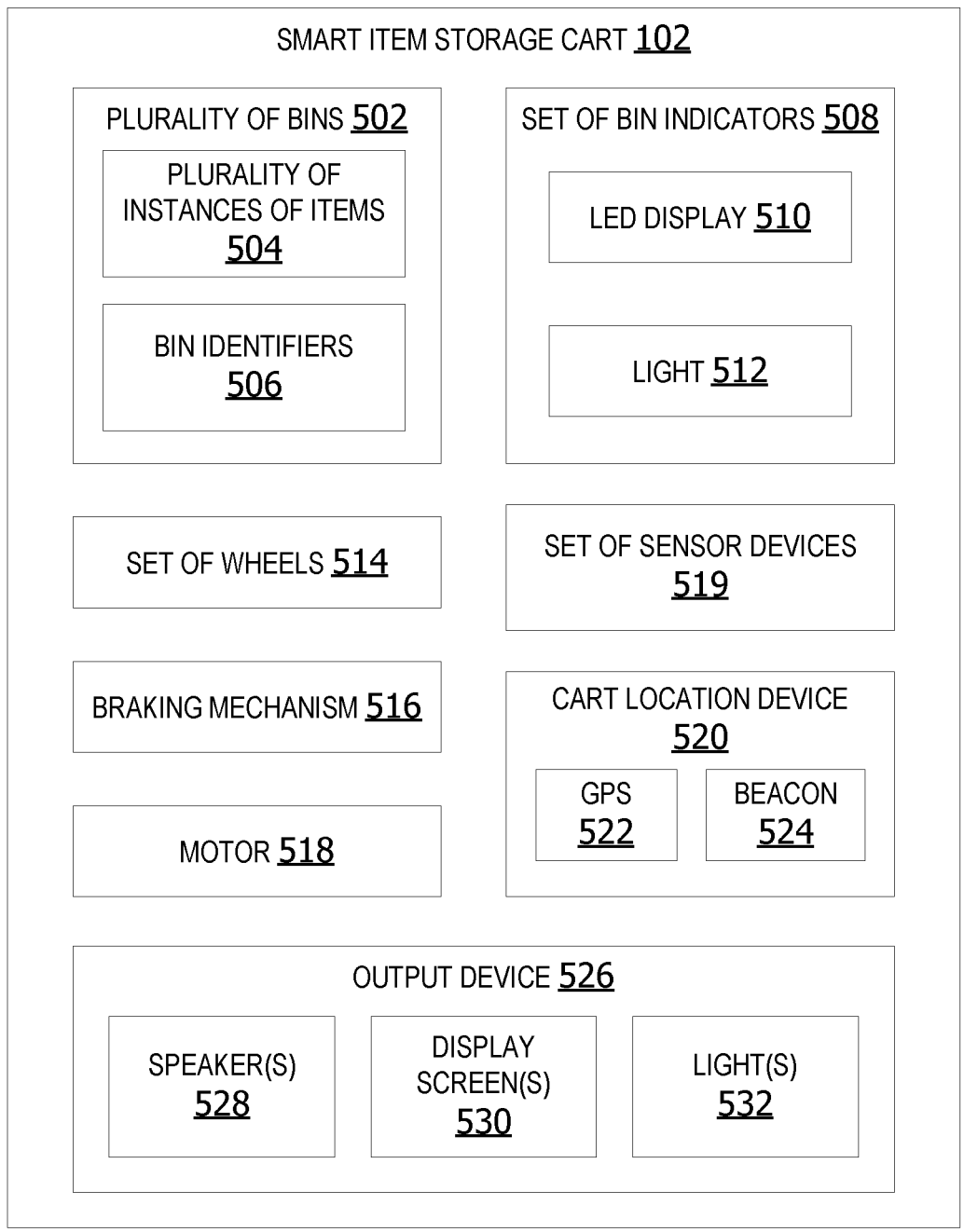
FIG. 5 is an exemplary block diagram illustrating a smart item storage cart.

FIG. 5 is an exemplary block diagram illustrating a smart item storage cart 102. The smart item storage cart 102 includes a plurality of bins 502 for storing a plurality of instances of one or more items 504. The item storage bins in the plurality of bins 502 may include one or more bin identifiers 506. In some examples, each bin in the plurality of bins 502 includes a unique bin identifier.

The smart item storage cart 102 includes a set of one or more bin indicators 508. A bin indicator may be implemented as a light emitting diode (LED) display 510 and/or a light 512. In some examples, a bin indicator is associated with each item storage bin in the plurality of bins 502.

The smart item storage cart 102 includes a set of wheels 514, a braking mechanism 516 associated with the set of wheels 514, and a motor 518. The set of wheels 514 includes one or more wheels or rollers. In some examples, the set of wheels 514 includes four wheels.

The smart item storage cart 102 may include a set of sensor devices 519 associated with the set of bins 502. The set of sensor devices 519 may include one or more temperature sensors, pressure sensors, motion sensors, weight sensors, location sensors, humidity sensors, infrared sensors, cameras, and/or any other type of sensors. A cart location device 520 may be included to output a signal or other location data utilized by the smart item storage cart 102 to determine a location of the cart and/or boundaries of geofence areas. The cart location device 520 may include a global positioning system (GPS) 522, a beacon 524, or other location device.

An output device 526 optionally provides one or more speaker(s) 528, one or more display screen(s) 530, one or more light(s) 532, and/or one or more other devices. The output device outputs alarms/alerts, notifications or other information to a user. In some examples, the output device 526 outputs a first alert recommending return of the smart item storage cart to the temperature-controlled area on condition the cart's dwell-time exceeds a first per-item maximum dwell-time. In other examples, the output device 526 outputs a second alert recommending disposal of a set of items on the smart item storage cart on condition the dwell-time exceeds a second per-item maximum dwell-time.

Figure 6:
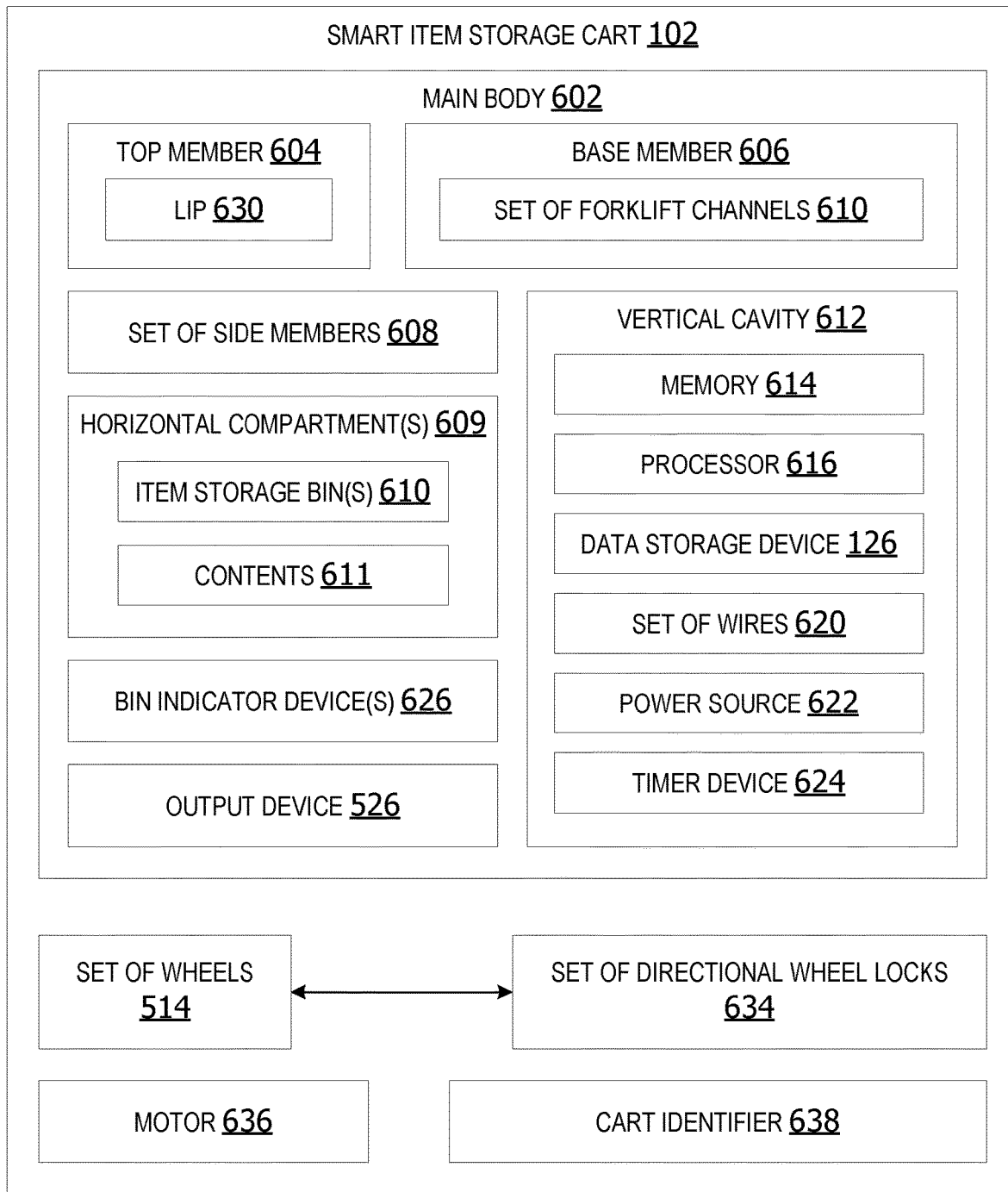
FIG. 6 is an exemplary block diagram illustrating a smart item storage cart.

FIG. 6 is an exemplary block diagram illustrating a smart item storage cart 102. A main body 602 of the smart item storage cart 102 includes a top member 604, a base member 606, a set of one or more side members 608, and one or more item storage bins 610 in one or more horizontal compartments 609. In some examples, one horizontal compartment within the main body 602 encloses a single item storage bin including contents 611 of each bin.

A set of forklift channels 610 within the base member 606 are configured to enclose a pair of forks on a forklift. The forklift channels 610 enables the smart item storage cart to be loaded onto a transportation vehicle or unloaded off the transportation vehicle by a forklift.

A vertical cavity 612 passing through a center of the main body 602 encloses a memory 614, at least one processor 616 communicatively coupled to the memory 614. The vertical cavity 612 may optionally also include a data storage device 618, a set of wires 620, and a power source 622.

A timer device 624 is configured to monitor a dwell-time during which the smart item storage cart 102 remains outside a temperature-controlled area. The timer device 624 is configured to monitor the cart's dwell-time based on the location of the smart item storage cart 102.

The main body 602 may also include one or more bin indicator device(s) 626 and/or an output device 526. The bin indicator device(s) 626 in some examples includes an indicator associated with each bin on the smart item storage cart 102. A bin indicator device activates to indicate a selected item storage bin on the smart item storage cart 102. A bin indicator device may include a partial bin indicator light indicating a portion of the contents of a bin for removal, as well as a full bin indicator light indicating the full contents of the bin for removal.

In one non-limiting example, a bin indicator device activates (lights up or displays information) to identify a quantity of items within a selected bin designated for removal from the stackable item storage cart for placement on an item display. In another non-limiting example, a bin indicator device activates to indicate a quantity of contents of an item storage bin scheduled to be removed from the item storage bin and placed on an item display.

The power source 622 may be connected to each bin indicator device via the set of wires 620. The set of wired connections run from the vertical cavity 612 through a horizontal channel to each bin restock indicator.

In some examples, the top member 604 also includes a lip 630. The lip 630 is a raised lip or ridge extending upward along an outer edge of the top member 604.

A set of four wheels 632 is attached to a bottom surface of the base member 606. A set of directional wheel locks 634 is configured to lock the set of four wheels 632 in a locked configuration for stacking the smart item storage cart 102 on top of another smart item storage cart or for stacking another item storage cart on top of the smart item storage cart 102. A motor 636 is coupled to the set of wheels 514 to provide self-propulsion for the smart item storage cart 102.

The smart item storage cart 102 may optionally include a cart identifier 638. The cart identifier 638 is a unique identifier on an exterior portion of the smart item storage cart 102. The cart identifier 638 may be implemented as a barcode, a universal product code (UPC), a matrix barcode, a quick response (QR) code, a text label having a letter or number code, a radio frequency identifier (RFID) tag, or any other type of identifier for distinguishing one cart from another cart.

Figure 7:
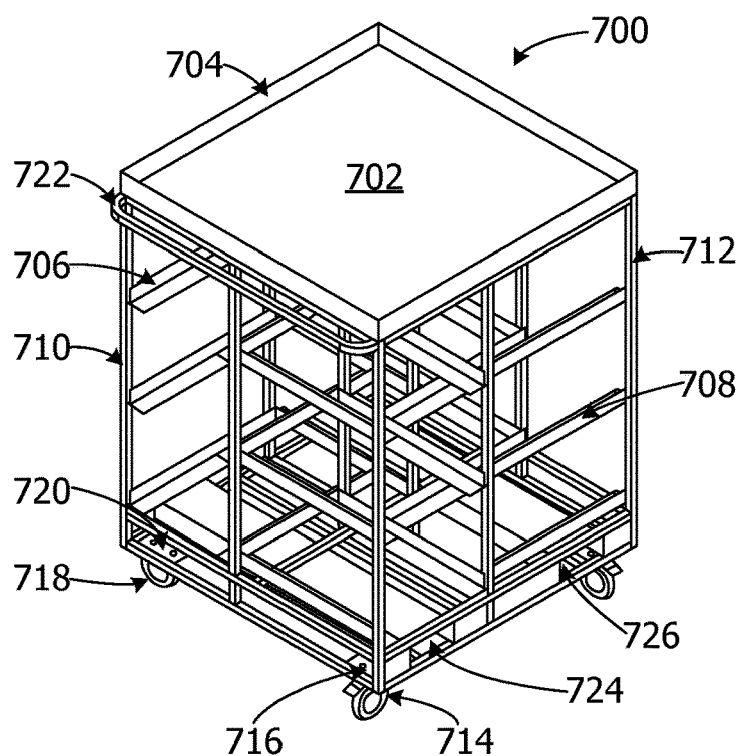
FIG. 7 is an exemplary schematic diagram illustrating an empty item storage cart.

FIG. 7 is an exemplary schematic diagram illustrating an empty item storage cart 700. A top member 702 includes a lip 704 along the outer edge of the top member 702. The empty item storage cart 700 includes horizontal runners, such as the runner 706 and 708 for supporting item storage bins. Vertical tubing provides support for the horizontal runners 706, such as the tubing 710 and 712.

In some examples, the wiring for the bin indicators runs through the tubing. The tubing may be two inches wide in some examples. In other examples, the tubing has an interior diameter of two and one-half inches.

Each pair of runners forms a compartment for an item storage bin. A storage bin rests on the pair of runners and slides along the runners to open/remove the bin or close/slide the bin back inside the compartment.

The wheels are attached to the cart via caster plates. For example, wheel 714 is connected to plate 716 and wheel 718 attaches to plate 720.

The empty item storage cart 700 may optionally include a handle 722. The handle enables a user to manually push the item storage cart. Forklift channels 724 and 726 are configured to enclose forks of a forklift for transportation of the item storage cart 700 for shipping to a store or return to a DC.

Figure 8:
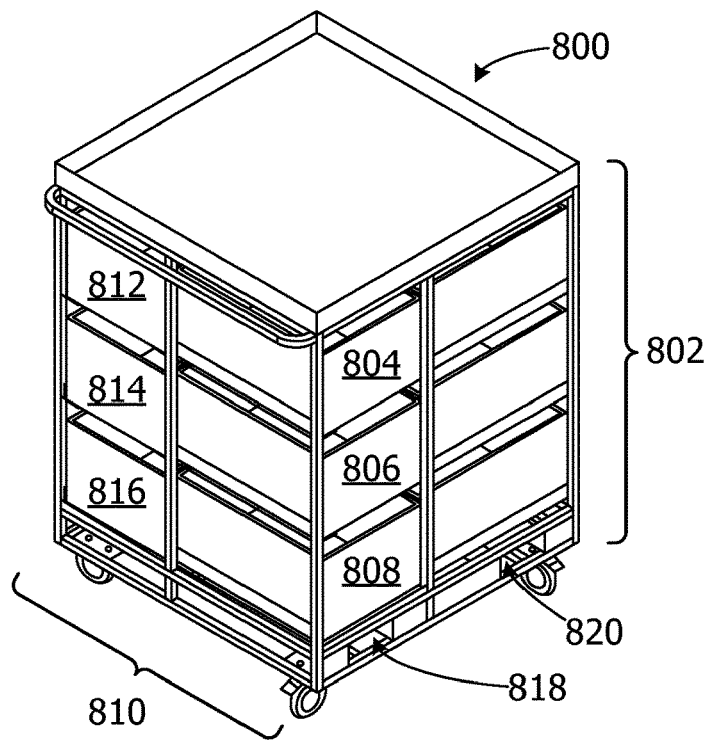
FIG. 8 is an exemplary schematic diagram illustrating an empty item storage cart including a plurality of item storage bins.

FIG. 8 is an exemplary schematic diagram illustrating an empty item storage cart 800 including a plurality of item storage bins. The empty item storage cart 800 includes a first side member 802 including three vertical compartments enclosing three item storage bins arranged in a vertically stacked configuration. In this example, the side member 802 includes bin 804, 806, and 808. The bins 804, 806 and 808 are facing outward at the first side member. However, the sides of the bins 804, 806 and 808 may be seen at the second side member 804.

The second side member 804 includes three vertical compartments enclosing three item storage bins arranged in the vertically stacked configuration. The three item storage bins in this example include item storage bins 812, 814 and 816 facing outward at the second side member 804.

The third side member (not shown) also includes three vertical compartments enclosing three item storage bins arranged in the vertically stacked configuration. The fourth side member of the cart (not shown) includes three more vertical compartments enclosing three item storage bins arranged in the vertically stacked configuration.

The empty item storage cart 800 in this example includes a forklift channel 818 and another forklift channel 820. The forklift channels 818 and 820 enable a forklift to lift the fully stocked item storage cart onto a transportation vehicle, such as a truck or ship and/or remove the item storage cart off a transportation vehicle.

Although the cart in this example includes three item storage bins on each side of the cart in a single vertical column, the examples are not limited to this configuration of bins. The item storage bins may be arranged on the cart in any configuration using any number of bins on any number of levels of the cart. For example, there may be four item storage bins on each side of the cart. In still other examples, two bins may be located side by side on a single level of the cart. In other examples, the cart may include two levels of item storage bins instead of three levels of item storage bins, etc.

In one non-limiting example, the item storage cart 800 is constructed of welded steel with one-inch square tubing. The top member may be sixteen-gauge steel, the runners may be fourteen-gauge steel, and the cater plates are three-sixteenths inch steel. The set of wheels are five inches by one and one-fourth inch swivel casters with directional locks. In some examples, the item storage cart has a storage weight capacity in a range from one thousand to eleven hundred pounds. In one example, the weight limit is one thousand fifty pounds. The forklift channels in another example are implemented as fourteen-gauge fork channels.

Figure 9:
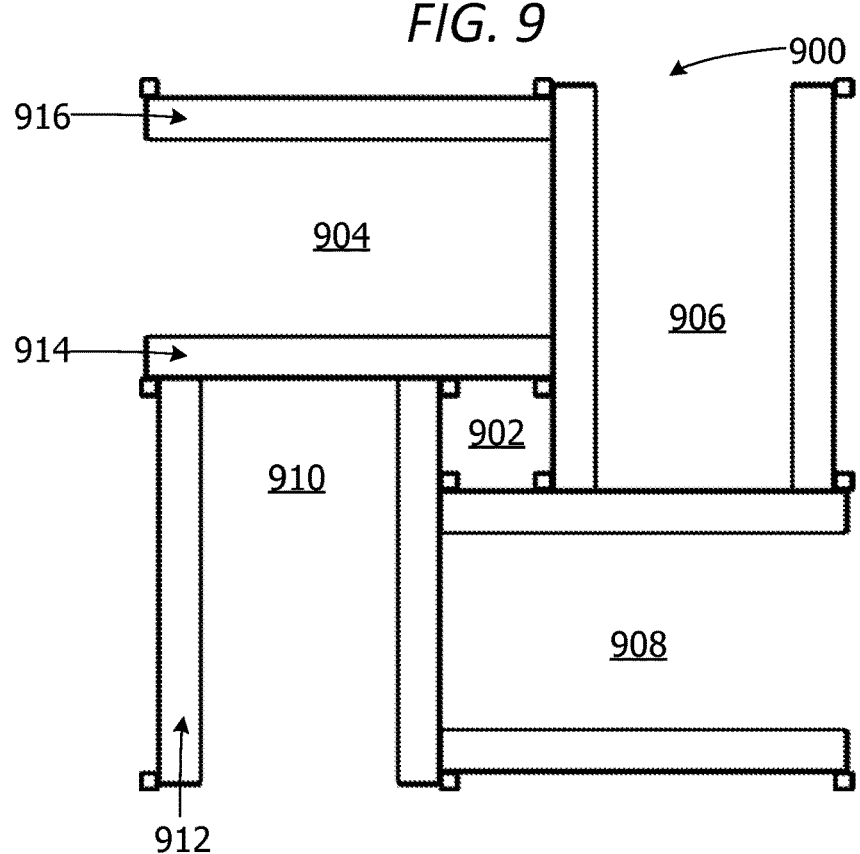
FIG. 9 is an exemplary cross-section view of an empty item storage cart.

FIG. 9 is an exemplary cross-section view of an item storage cart 900. A central cavity 902 encloses the memory, processor, wires, power source, and/or a data storage device. The item storage cart 900 includes compartments 904, 906, 908, and 910 for holding item storage bins. Each item storage bin rests on a runner, such as the runners 912, 914, and 916. In this example, an item storage bin in the compartment 904 rests on the runners 914 and 916.

Figure 10:
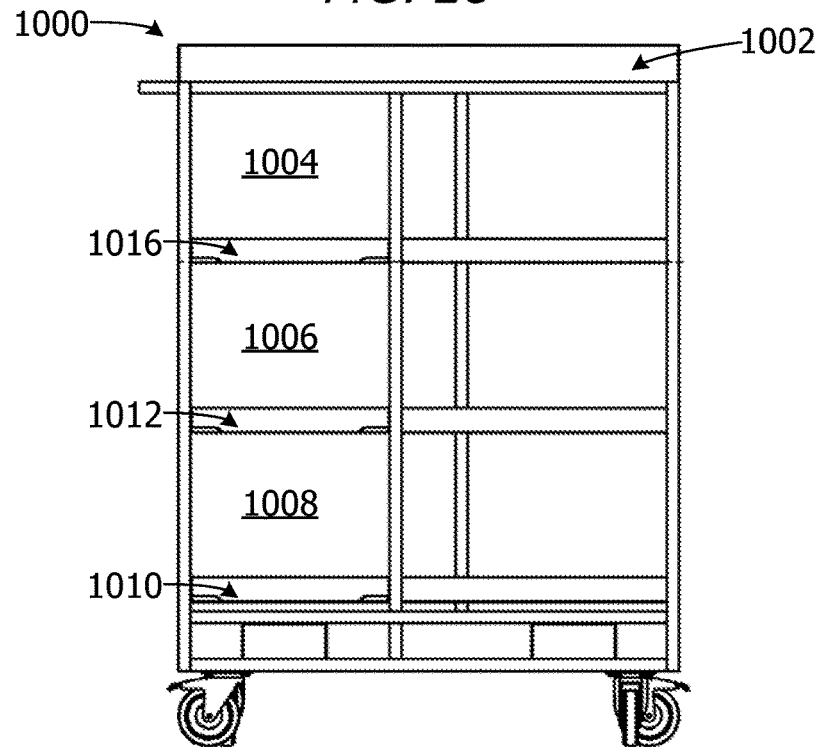
FIG. 10 is an exemplary side view of an empty item storage cart.

FIG. 10 is an exemplary side view of an item storage cart 1000. The item storage cart 1000 includes a lip 1002 along the top member of the cart. In this example, an item storage bin 1004 is placed on a top (first) level, an item storage bin 1006 is placed on the middle (second) level, and an item storage bin 1006 I spaced on the bottom (third) level of the cart. Each item storage bin includes a bin indicator device. The item storage bin 1008 has a bin indicator 1010 located just below the bin. The item storage bin 1006 includes a bin indicator 1012, and the item storage bin 1004 includes a bin indicator device 1016.

In one example, if the user is assigned to restock a side-counter using apples from the item storage bin 1006, the bin indicator 1012 lights up and/or displays an indicator identifying the contents of bin 1006 for removal. The indicator may include a symbol, letter, number, word, sentence, instruction, icon, or other indicator informing the user as to which items to remove from the cart for restocking.

In another example, if the user is assigned to restock a display with half the oranges in the item storage bin 1008 and leave the other half of the oranges in the bin 1008, the bin indicator 1010 outputs an indicator identifying half the contents of the bin 1008 for removal. In this example, the bin indicator may light up a half-circle, provide a fifty percent symbol on a small LED screen, output the word half, or otherwise provide an indicator instructing the user to remove only a portion of the contents of the bin.

In one example, the indicator is an LED display which scrolls text, shows pictures, and/or outputs colors. The LED display in one example is one inch in height and two inches long. In another example, the LED display is one inch in length and three inches long.

In one example, the length of a side of an item storage bin is twenty-four inches long. In another non-limiting example, the width of the item storage bin is sixteen and one-half inches wide. In yet another non-limiting example, a height of an item storage bin is fourteen inches high.

Figure 11:
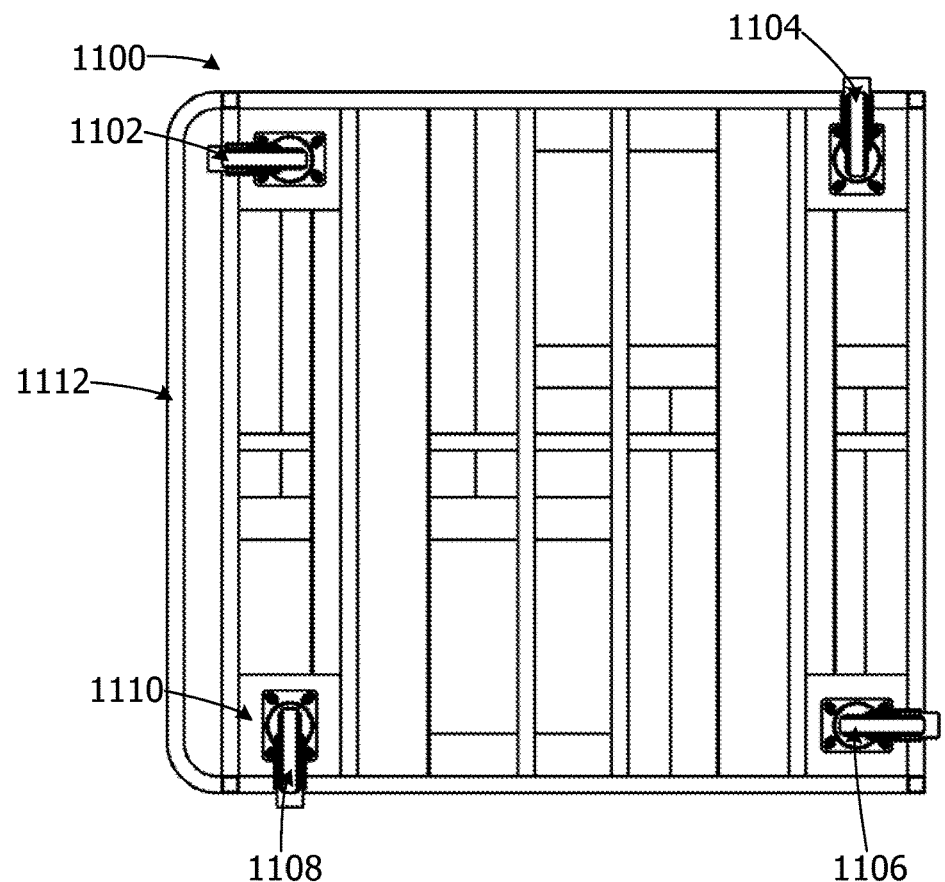
FIG. 11 is an exemplary bottom view of an item storage cart.

FIG. 11 is an exemplary bottom view of an item storage cart 1100. The item storage cart 1100 includes the wheels 1102, 1104, 1106, and 1108. Each wheel is attached via a plate, such as the plate 1110. The cart may include a handle 1112. Each wheel caster in this non-limiting example is in a locked orientation for nested stacking of carts.

In one non-limiting example, the item storage cart's base member has an overall length of forty-four inches and an overall width of forty-one inches. The item storage cart in another example has an overall height of fifty-eight inches. However, the examples are not limited to these examples. In other examples, the item storage cart may have different measurements. For example, an item storage cart may have a length of forty-two inches, a width of forty inches, and a height of sixty inches.

Figure 12:
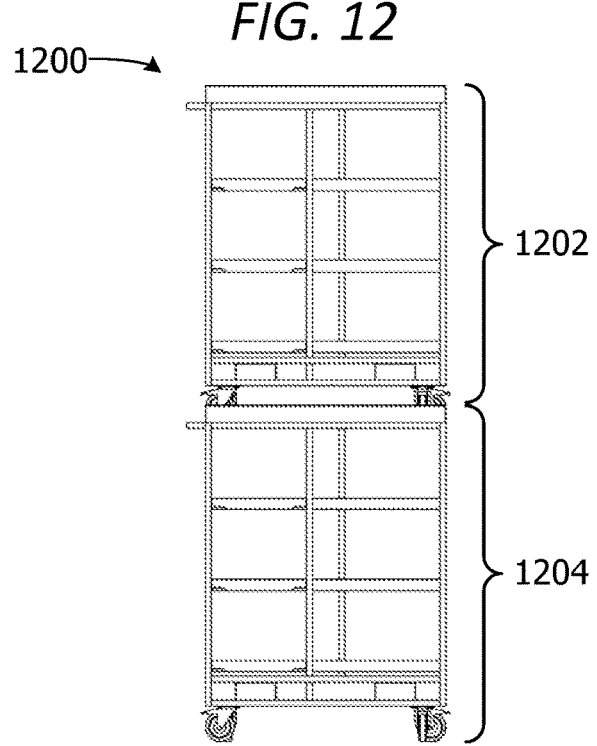
FIG. 12 is an exemplary side view of stacked item storage carts.

FIG. 12 is an exemplary side view of stacked item storage carts 1200. In this non-limiting example, an item storage cart 1202 is stacked on top of another item storage cart 1204 for transportation. The carts are stacked with the wheels locked in an outward configuration to prevent the wheels from rolling/turning. The lip on the bottom cart 1204 prevents the top cart 1202 from shifting or sliding off. Both carts are wrapped in sheets of plastic shrink wrap or otherwise secured together prior to shipping.

Figure 13:
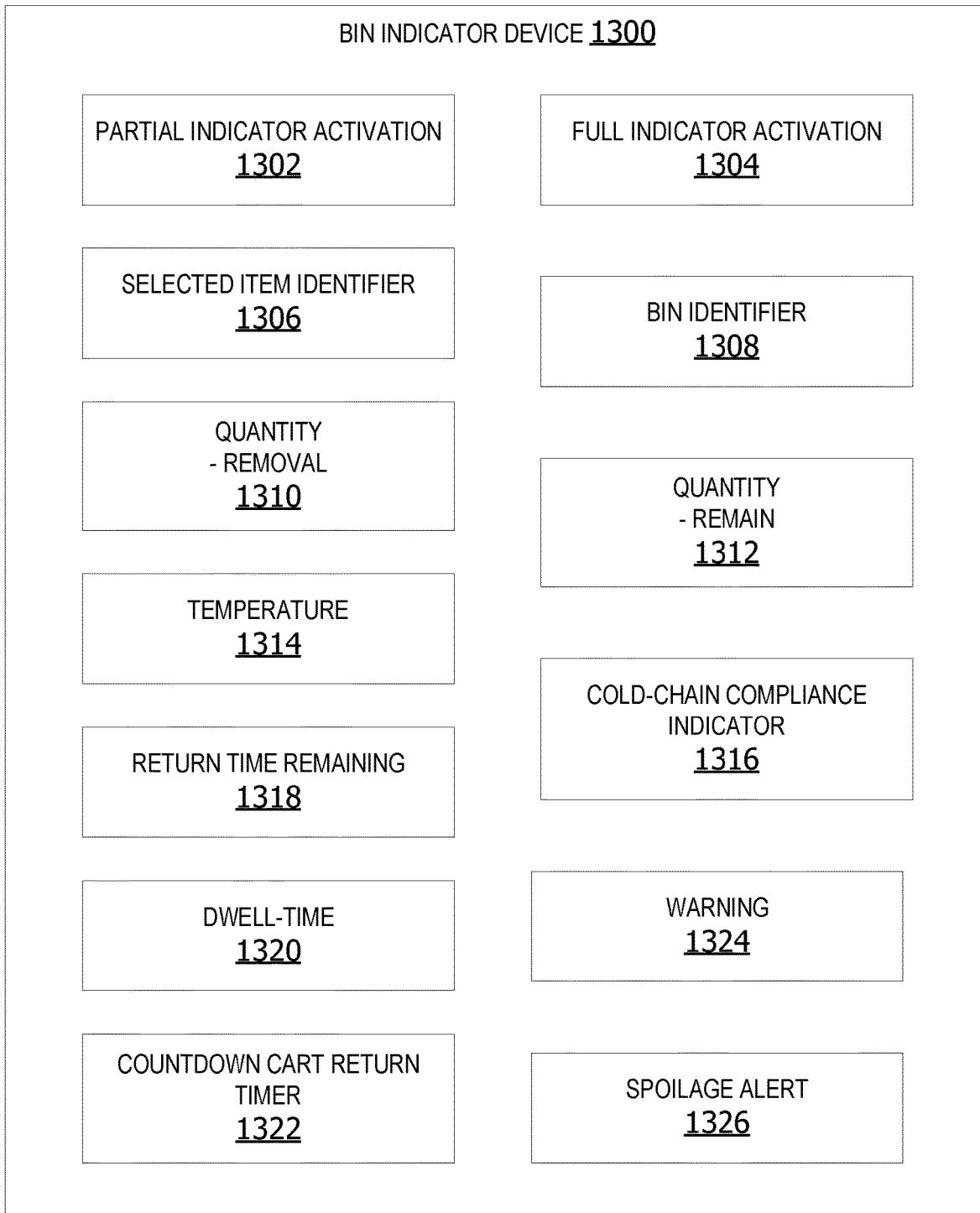
FIG. 13 is an exemplary block diagram illustrating a bin indicator device.

FIG. 13 is an exemplary block diagram illustrating a bin indicator device 1300. The bin indicator device 1300 may provide a partial indicator activation 1302 indicating only a portion of the contents of an item storage bin for removal from the bin. The bin indicator device 1300 may provide a full indicator activation 1304 indicating all the contents of the bin for removal or indicating the entire bin is to be filled with instances of a selected item.

The bin indicator device 1300 may output/display a selected item identifier 1306 identifying the items inside the item storage bin or identifying the items that are to be placed inside the item storage bin. A bin identifier 1308 is a unique identifier associated with each bin. The bin identifier 1308 may include a serial number, a barcode, a matrix barcode, a QR code, a UPC code, an RFID tag, or any other type of identifier. The bin identifier 1308 may be displayed indicating which bin should be filled. For example, if a bin is identified as bin number 2A, a bin indicator displaying the word "apple" and the bin identifier "2A", indicates the user is instructed to fill the bin "2A" with apples.

The bin indicator device 1300 in some examples includes a quantity 1310 for removal and/or a quantity 1312 of instances of the item to remain in a given item storage bin. The bin indicator device 1300 may also output a current temperature 1314 inside a given item storage bin, a cold-chain compliance indicator 1316 indicating whether the items in a given bin are cold-chain compliant, a return time remaining 1318 indicating how much time remains before the item storage cart must be returned to a temperature-controlled area, and/or a current dwell-time 1320 indicating how long the cart has been outside the temperature-controlled area.

The bin indicator device 1300 in other examples provides a countdown cart return timer 1322 providing a countdown timer indicating when the cart should be returned to the temperature-controlled area. For example, if the threshold dwell-time for the item storage cart is five minutes away, the countdown cart return timer 1322 provides a countdown from five minutes down to zero. The countdown cart return timer 132 informs the user stocking displays with items obtained from the cart how much time remains to complete the restocking task.

A warning 1324 may be given when the cart's dwell-time is approaching the maximum dwell-time for items on the cart. For example, if the cart's dwell-time is ten minutes away from reaching the maximum dwell-time, the bin indicator device 1300 may output a ten-minute warning, provide an audible alarm, flash a warning light, a text warning, output a notification to a user device, or any other warning. An audible alarm may include a beeping, ringing, verbal recorded warning, or any other sound. A warning light may include a red light, a yellow light, a flashing light, etc. A text warning may include a display of the words "ten-minute warning", "10 minutes", "return cart", or any other warning text. If the cart remains outside the temperature-controlled area for too long (past threshold maximum dwell-time), a spoilage alert 1326 may be provided by the bin indicator device 1300.

Figure 14:
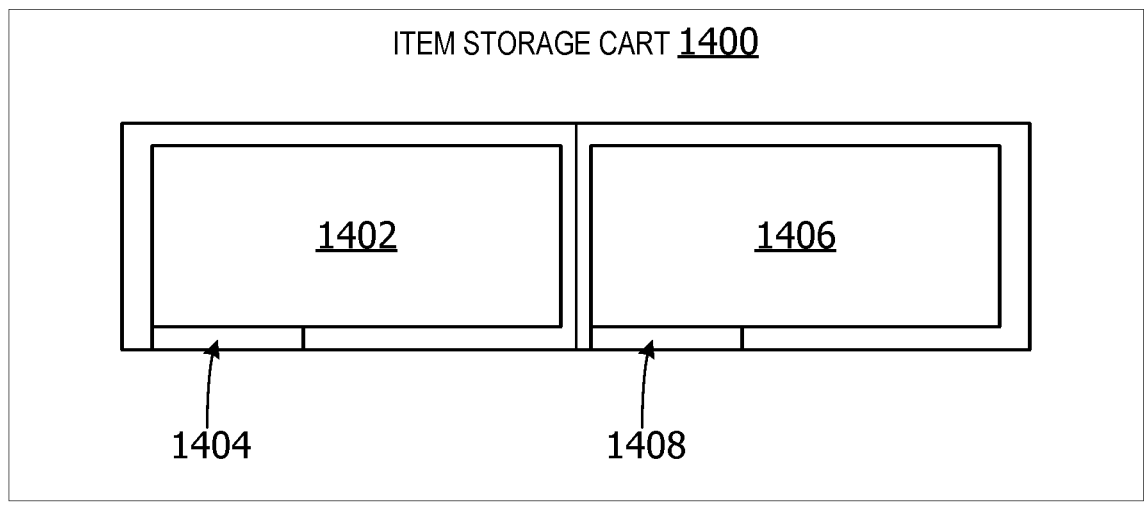
FIG. 14 is an exemplary block diagram illustrating bin indicator devices on an item storage cart.

FIG. 14 is an exemplary block diagram illustrating bin indicator devices on an item storage cart 1400. In this example, two item storage bins are side-by-side on a single level of the cart. Larger item storage bins such as these may accommodate larger items, such as, but not limited to, melons, pineapples, or other large items. Each item storage bin includes a bin indicator device. In this example, item storage bin 1402 is associated with bin indicator device 1404. Likewise, item storage bin 1406 is associated with bin indicator device 1408.

Figure 15:
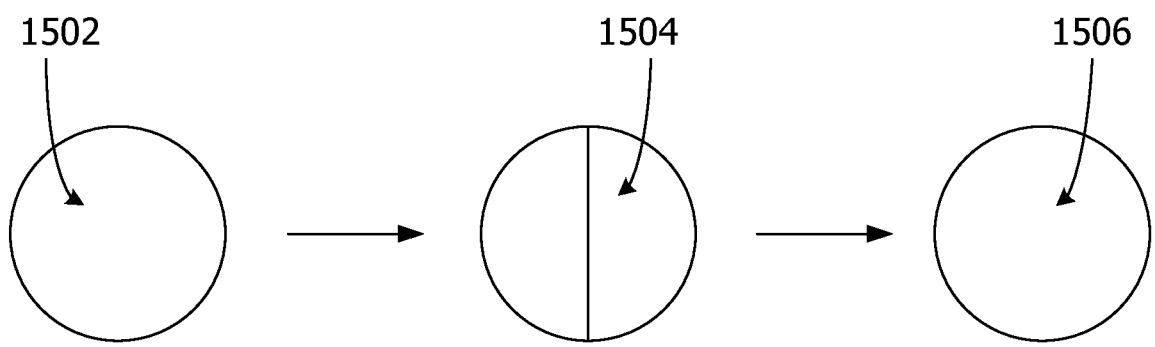
FIG. 15 is an exemplary block diagram illustrating bin indicator device lights.

FIG. 15 is an exemplary block diagram illustrating bin indicator device lights. In this example, a fully lit indicator light identifies an item storage bin whose contents are to be completely emptied to fully stock a display/side-counter. The light is fully turned on if a full case is to be stocked.

The indicator light 1504 is half-lit indicating only half the contents of a given item storage bin are to be removed and utilized for restocking the display. In some examples, the indicator is half lit if only half a display case is to be stocked. The turned off (de-activated) bin indicator light indicates the item storage bin is empty/all contents of the bin have been utilized to stock the display(s).

In some examples, the system assumes that items in a selected bin that has a fully lit indicator have all been removed if the cart has been moved to the sales floor. In other words, once a cart is removed to the salesfloor, the system assumes any items in bins with a fully lit indicator have been utilized to stock the display(s) on the salesfloor. When the cart returns to the storage area, the system automatically turns the light off and updates the cart inventory to indicate the items associated with the selected bin have been added to the display(s)/removed from the cart.

Figure 16:
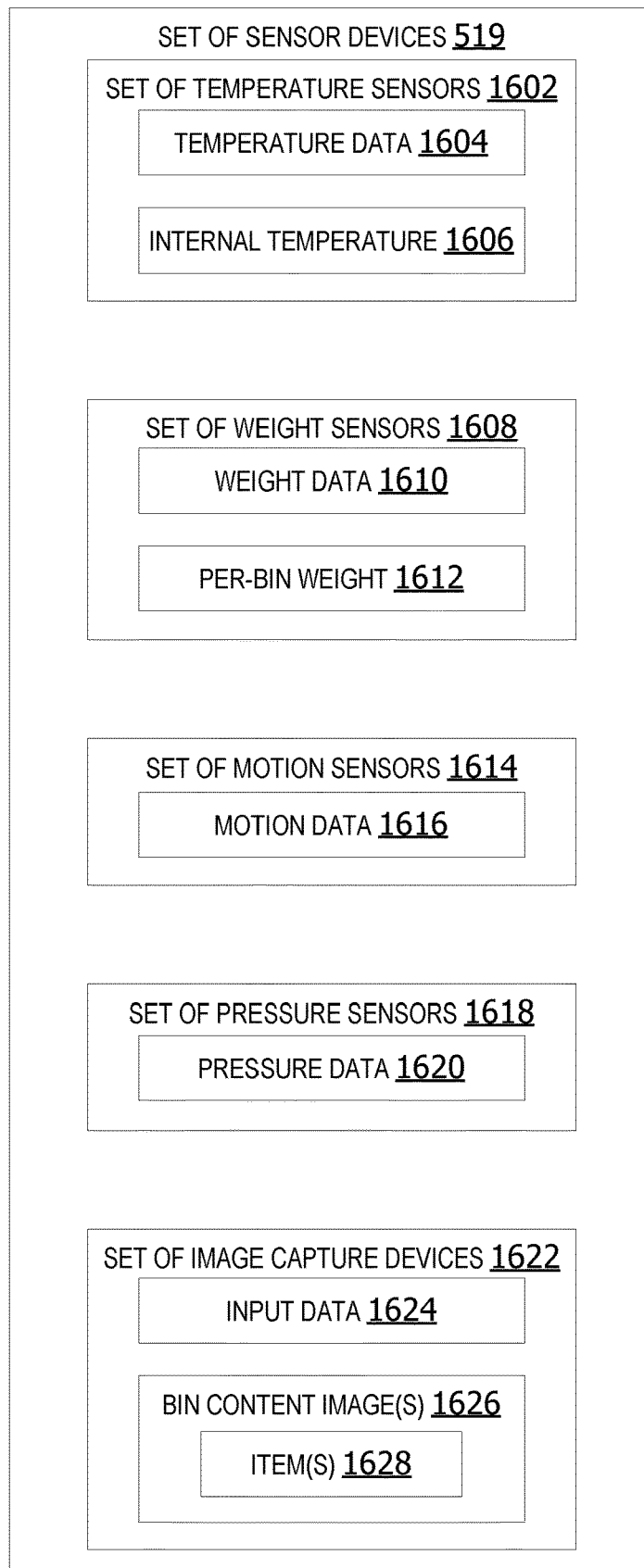
FIG. 16 is an exemplary block diagram illustrating a set of sensor device on an item storage cart.

FIG. 16 is an exemplary block diagram illustrating a set of sensor devices 519 on an item storage cart. The set of sensor devices 519 in some examples includes a set of one or more temperature sensors 104 generate temperature data 1604 associated with an internal temperature 1606 of the item storage cart.

A set of one or more weight sensors 1608 generates weight data 1610 associated with items on the item storage cart. In some examples, the weight data 1610 indicates a per-bin weight for each item storage bin. A set of one or more motion sensors 1614 may be included. The set of motion sensors 1614 generate motion data 1616 associated with movement of the item storage cart and/or motion of each item storage bin on the cart.

The set of sensors may optionally include a set of one or more pressure sensors 1618. A pressure sensor in the set of pressure sensors 1618 generates pressure sensor data 1620 associated with items within each item storage bin and/or items within the item storage bin.

The set of sensor devices 519 may include a set of image capture devices 1622 configured to generate image data 1624 associated with bin content image(s) 1626 of items (contents) in each item storage bin on the cart. The image data 1624 in some examples is utilized to verify the contents of each item storage bin.

In still other examples, the set of sensor devices 519 may include optical sensors, heat sensors, off-gassing sensors for detecting item spoilage, etc.

Figure 17:
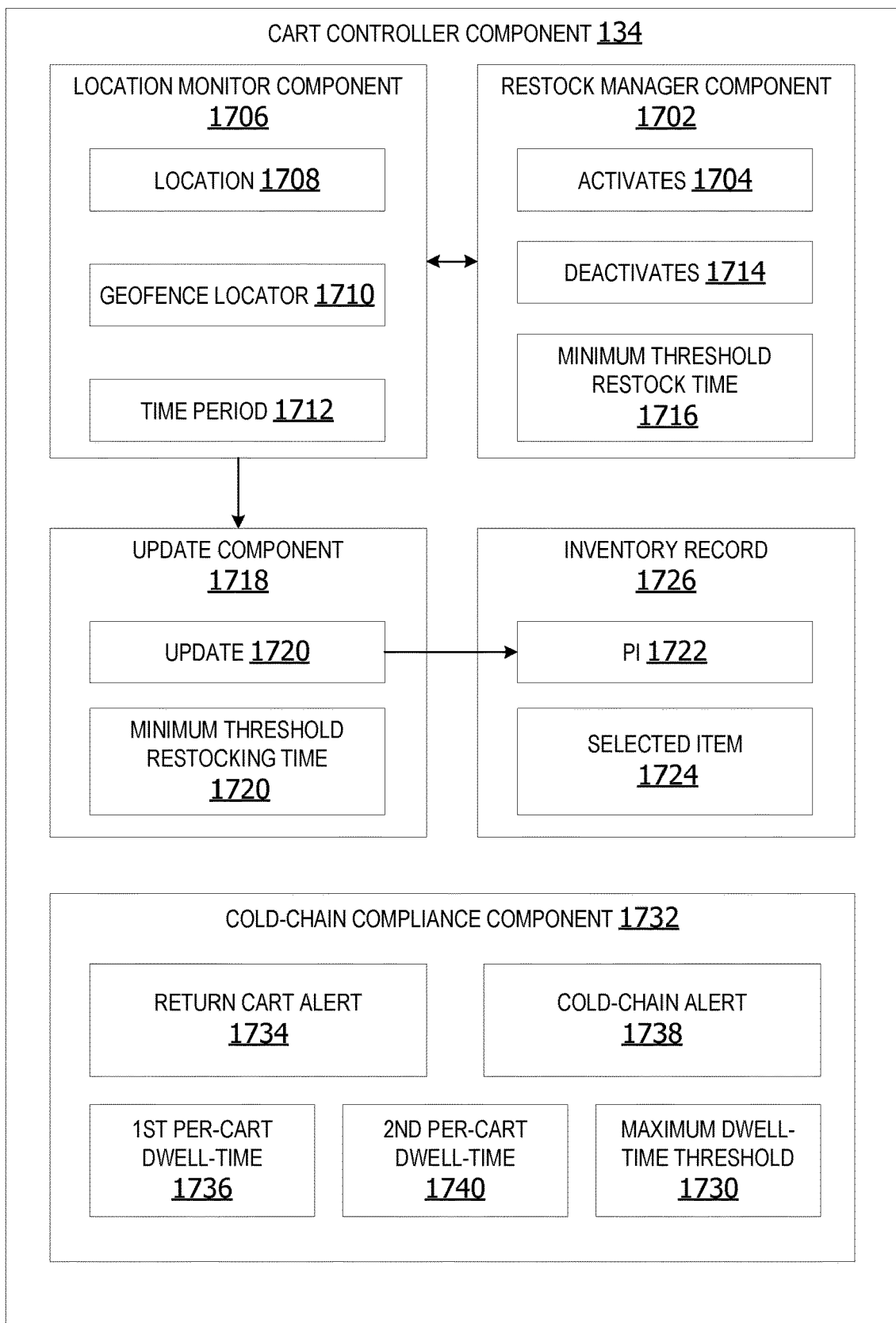
FIG. 17 is an exemplary block diagram illustrating a cart controller component.

FIG. 17 is an exemplary block diagram illustrating a cart controller component 134. A restock manager component 1702 activates 1704 a bin restock indicator associated with at least one bin in a plurality of bins on an item storage cart indicating that instances of a selected item in the bin are ready to be used for stocking a display. In some examples, the restock manager component 1702 partially activates the bin indicator to indicate a portion of the instances of a selected item in a given item storage bin for removal from the at least one bin and placement on the item display area assigned to the selected item, wherein a portion of the plurality of items in the at least one bin remain in the at least one bin.

A location monitor component 1706 monitors a location 1708 of the smart storage cart within an item selection area. The location monitor component 1706 in some examples detects the smart storage cart exiting a first geofence area and entering a second geofence area associated with at least one display area within the item selection area assigned to the at least one item. A geofence locator 1710 may be utilized to detect the boundaries of a geofence area. The location monitor 1706 monitors an amount of time or time-period 1712 during which the cart is outside a geofence area, as well as the time-period 1712 the cart is inside a geofence area.

The restock manager component 1702 de-activates 1714 the bin indicator if the time-period 1712 between removal of the smart storage cart form the second geofence area and return of the smart storage cart to the second geofence area exceeds the minimum threshold restocking time. The minimum threshold restocking time is an estimated amount of time required for a user to remove the items from the selected item storage bin and restock one or more item display areas.

An update component 1718 performs an update 1720 of the PI 1722 for the selected item 1724 in an inventory record 1726 on the data storage device. The update 1720 reflects removal of the instances of the selected item from the bin and placement of the instance of the selected item onto the item display areas assigned to the item if the smart storage cart is removed from the second geofence area for a minimum threshold restocking time 1728 and returned to the first geofence area within a maximum dwell time threshold 1730 for the cart. In some examples, the update component 1718 updates the inventory of items inventory record 1726 on the data storage device in response to addition of at least one item to the at least one item storage bin or removal of at least one item from the at least one item storage bin.

A cold-chain compliance component 1732 outputs a return cart alert 1734 recommending return of the smart storage cart to the temperature-controlled storage area on condition a first per-cart dwell-time 1736 after exiting the first geofence area expires. The cold-chain compliance component 1732 outputs a cold-chain alert 1738 (second alert) indicating items for disposal if a second per-cart dwell-time 1740 after exiting the first geofence area expires prior to return of the smart item storage cart to the temperature-controlled storage area.

Figure 18:
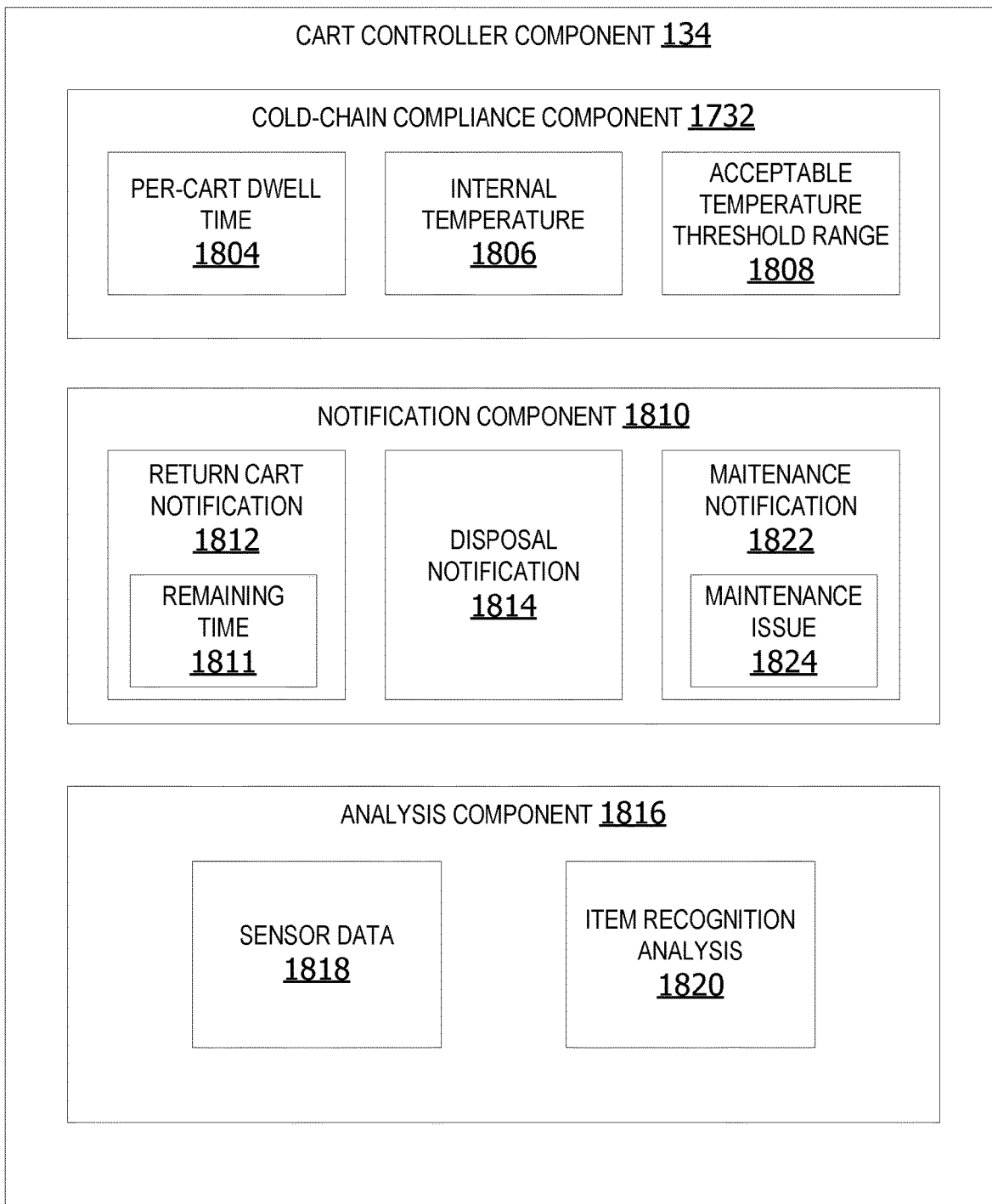
FIG. 18 is an exemplary block diagram illustrating a cart controller component for cold-chain compliance.

FIG. 18 is an exemplary block diagram illustrating a cart controller component 134 for cold-chain compliance. A cold-chain compliance component 1732 analyzes a per-cart dwell time 1804 and internal temperature 1806 of a given item storage cart using an acceptable temperature threshold range 1808 and the maximum threshold dwell-time customized for the items on the item storage cart. If the temperature falls outside the acceptable threshold temperature range and/or the dwell-time exceeds the maximum dwell-time threshold, the cold-chain compliance component 1732 triggers a notification component 1810 to send a notification to at least one user.

In some examples, the notification component 1810 outputs a return cart notification 1812 to the user and/or to a user device associated with the user. The return cart notification 1812 in some examples may include a remaining time 1811 until a maximum threshold dwell-time is reached.

In some examples, the return cart notification 1812 instructs the user to return of the smart storage cart to the temperature-controlled storage area. The return cart notification may be sent if the per-cart wait time expires prior to removal of the smart storage cart from the second geofence area, if the maximum threshold dwell-time is approaching (within a predetermined amount of time prior to reaching the maximum threshold dwell-time), or if sensor data indicates all items for restocking have been removed from the cart.

The notification component 1810 in other examples outputs a disposal notification 1814 instructing the user to dispose of one or more instances of the selected item associated with the at least one bin if a maximum per-cart dwell time-period after exiting the first geofence area expires prior to return of the smart item storage cart to the temperature-controlled storage area.

An analysis component 1816 analyzes sensor data 1818 generated by a set of sensor devices. The sensor data 1818 is analyzes using item recognition analytics to monitor the contents of each item storage bin and/or monitor an internal temperature associated with the contents of the item storage cart. The sensor data 1818 is analyzed to verify the proper quantity of instances of the selected item have been removed from the at least one bin upon return of the smart storage cart to the first geofence area. In still other examples, the sensor data is analyzed to detect spoilage of items within the item storage cart.

In still other examples, the notification component 1810 outputs a maintenance notification 1822 to a user device associated with a user indicating a maintenance issue associated with the smart storage cart if the cart controller component 134 stops receiving sensor data 1818 from the set of sensor devices. In this manner, the cart monitors its own maintenance needs. In other examples, the maintenance notification 1822 is sent if the internal temperature is outside an acceptable threshold temperature range.

Figure 19:
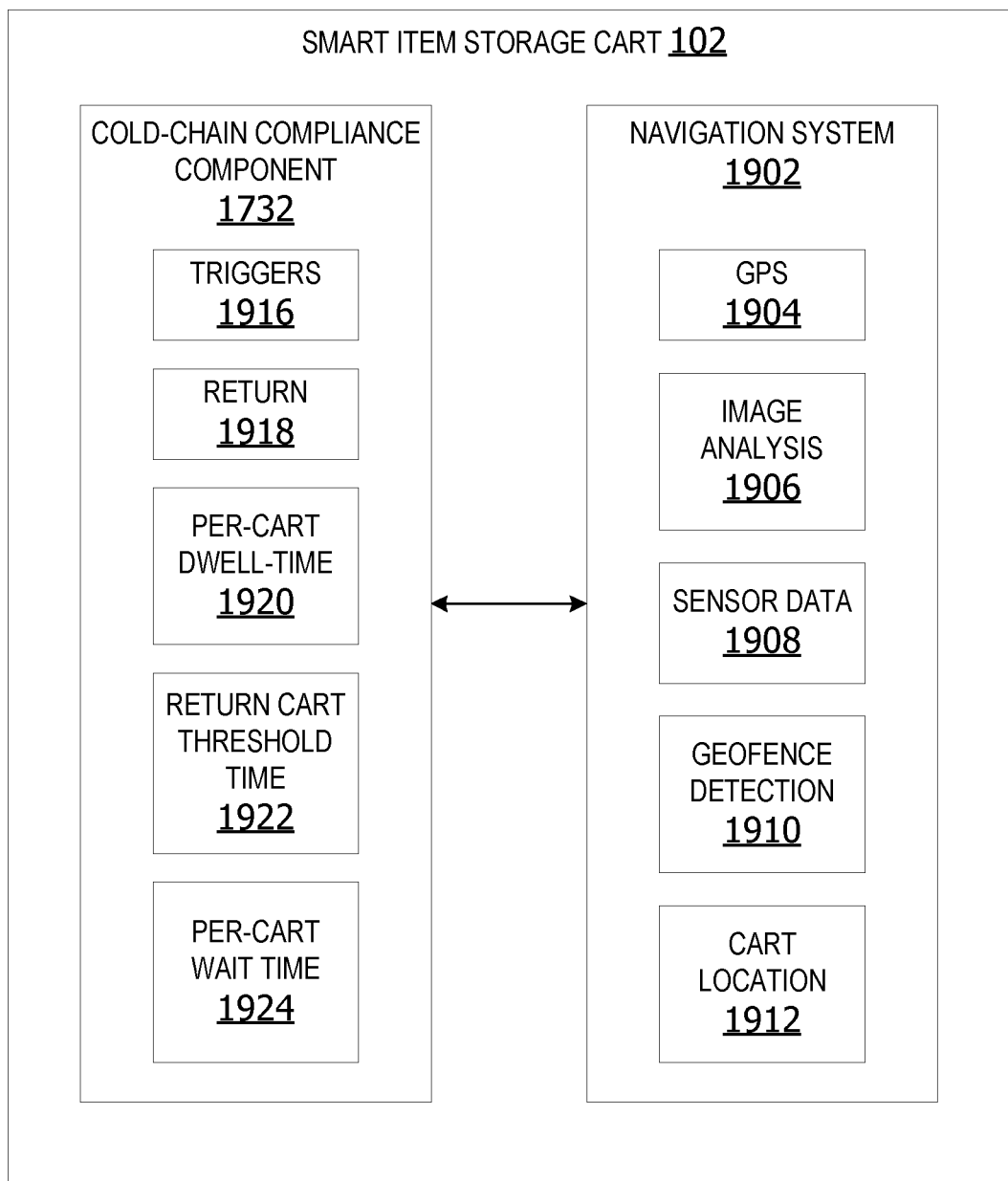
FIG. 19 is an exemplary block diagram illustrating a smart item storage cart including a navigation system.

FIG. 19 is an exemplary block diagram illustrating a smart item storage cart 102 including a navigation system 1902. The navigation system 1902 enables the smart item storage cart to move autonomously (self-propelled) around a DC or an item selection area without user intervention. The navigation system 1902 may include a GPS 1904, image analysis 1906 of sensor data, including image data received from cameras mounted on the cart, geo-fence detection 1910, and/or cart location 1912 via cart location devices.

The cold-chain compliance component 1732 triggers 1916 automatic return 1918 of the smart storage cart to the temperature-controlled storage area via the navigation system 1902 without user assistance. The return 1918 of the cart may be triggered if the per-cart dwell-time 1920 expires while the smart item storage cart is located outside the temperature-controlled storage area. In other examples, cart return 1918 may be triggered if the return cart threshold time 1922 is reached prior to return of the cart to the temperature-controlled area.

In another example, the navigation system 1902 automatically leaves a first geofence area in a storage area and goes to a second geofence area in proximity to an item display area in response to designation of instances of a selected item for restocking the item display. If the cart is removed from the second geofence area and then returned to the second geofence area by a user after a minimum restock time, the system assumes the instances of the item have been removed from the cart and used to restock the item display. The smart item storage cart then returns autonomously to the first geofence area when restocking is complete.

In another example, when the smart item storage cart arrives in the second geofence area, the self-propelled smart item storage cart waits within the second geofence area for the per-cart wait time 1924. However, if the cart is not removed from the second geofence area within a per-cart wait time 1924, the item storage cart automatically leaves the second geofence area and autonomously returns to the first geofence area to ensure cold-chain compliance for items on the cart upon expiration of the per-cart wait time.

Figure 20:
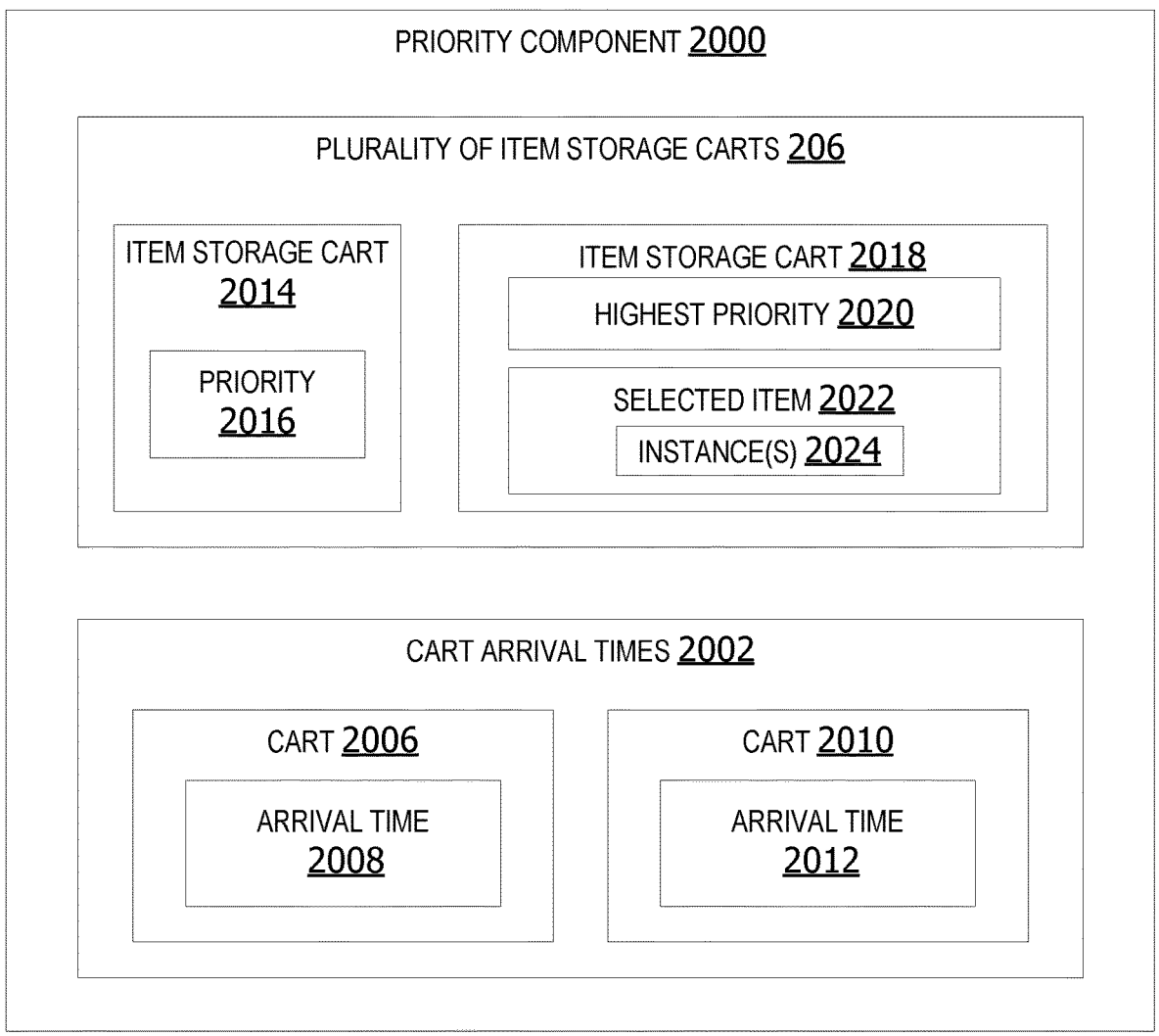
FIG. 20 is an exemplary block diagram illustrating a priority component for prioritizing item storage cart re-stock scheduling.

FIG. 20 is an exemplary block diagram illustrating a priority component 2000 for prioritizing item storage cart re-stock scheduling. The priority component 2000 analyzes cart arrival times 2002 for each cart in a plurality of item storage carts 206. The arrival time is a time at which an item storage cart arrives at an item selection area, such as a truck delivery date and time. In this example, the cart 2006 has a first arrival time 2008 and another cart 2010 has a different arrival time 2012. The priority component 2000 assigns a first-in first-out (FIFO) priority to each smart storage cart.

For example, an item storage cart 2014 may have a priority 2016 and another item storage cart 2018 may have a highest priority 2020 if the item storage cart 2018 arrived before the item storage cart 2014. Thus, highest priority item storage cart 2018 is selected to restock item displays prior to the lower priority item storage cart 2014. In some examples, a bin indicator on the item storage cart 2018 including instances 2024 of a selected item 2020 received prior to the item storage cart 2014 also storing instances of the same selected item 2022 is activated to select the first storage cart 2018 for restocking an item display area prior to the item storage cart 2014 based on the FIFO priority.

Figure 21:
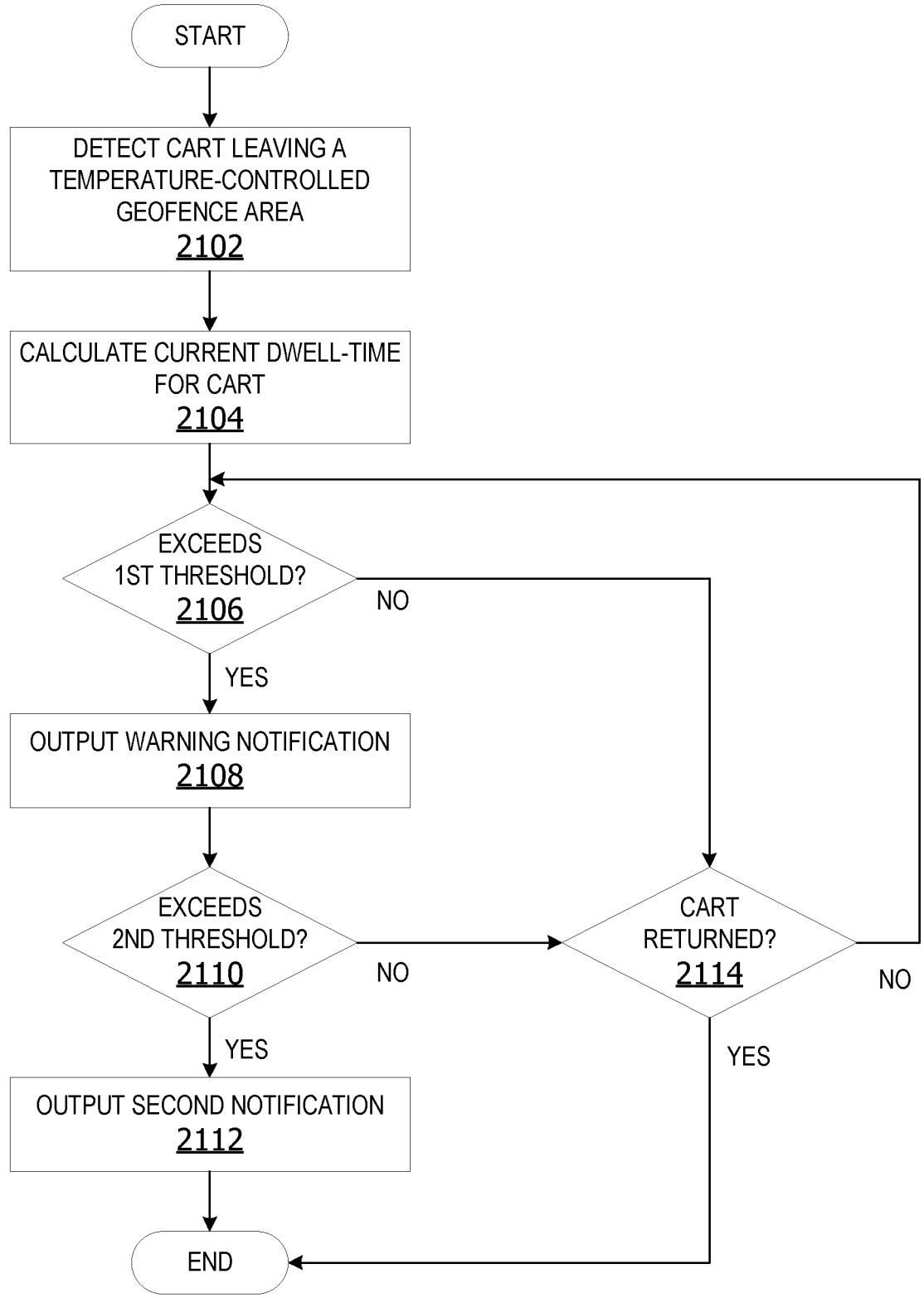
FIG. 21 is an exemplary flow chart illustrating operation of the computing device to output cold-chain compliant notifications associated with an item storage cart.

FIG. 21 is an exemplary flow chart illustrating operation of the computing device to output cold-chain compliant notifications associated with an item storage cart. The process shown in FIG. 21 may be performed by a cart controller component, executing on a smart item storage cart, such as the smart item storage cart 102 in FIG. 1, FIG. 17 and/or FIG. 18.

The process begins by detecting a cart leaving a temperature-controlled geofence area 2102. The cart controller component calculates current dwell-time for the cart at 2104. The cart controller component determines if the current dwell-time exceeds a first threshold at 2106. If yes, the cart controller component outputs a warning notification at 2108.

The cart controller component determines if the dwell-time exceeds a second threshold at 2110. If yes, the cart controller component outputs a second notification at 2112. The second notification in some examples is an item disposal/spoilage notification. The process terminates thereafter.

If the dwell-time exceeds the first threshold at 2106, the cart controller component determines if the cart is returned to the temperature-controlled area at 2114. If no, the process returns to 2106. The cart controller component iteratively executes operations 2106 through 2114 until the cart is returned to the temperature-controlled area. If the cart is returned to the temperature-controlled area at 2114, the process terminates thereafter.

Figure 22:
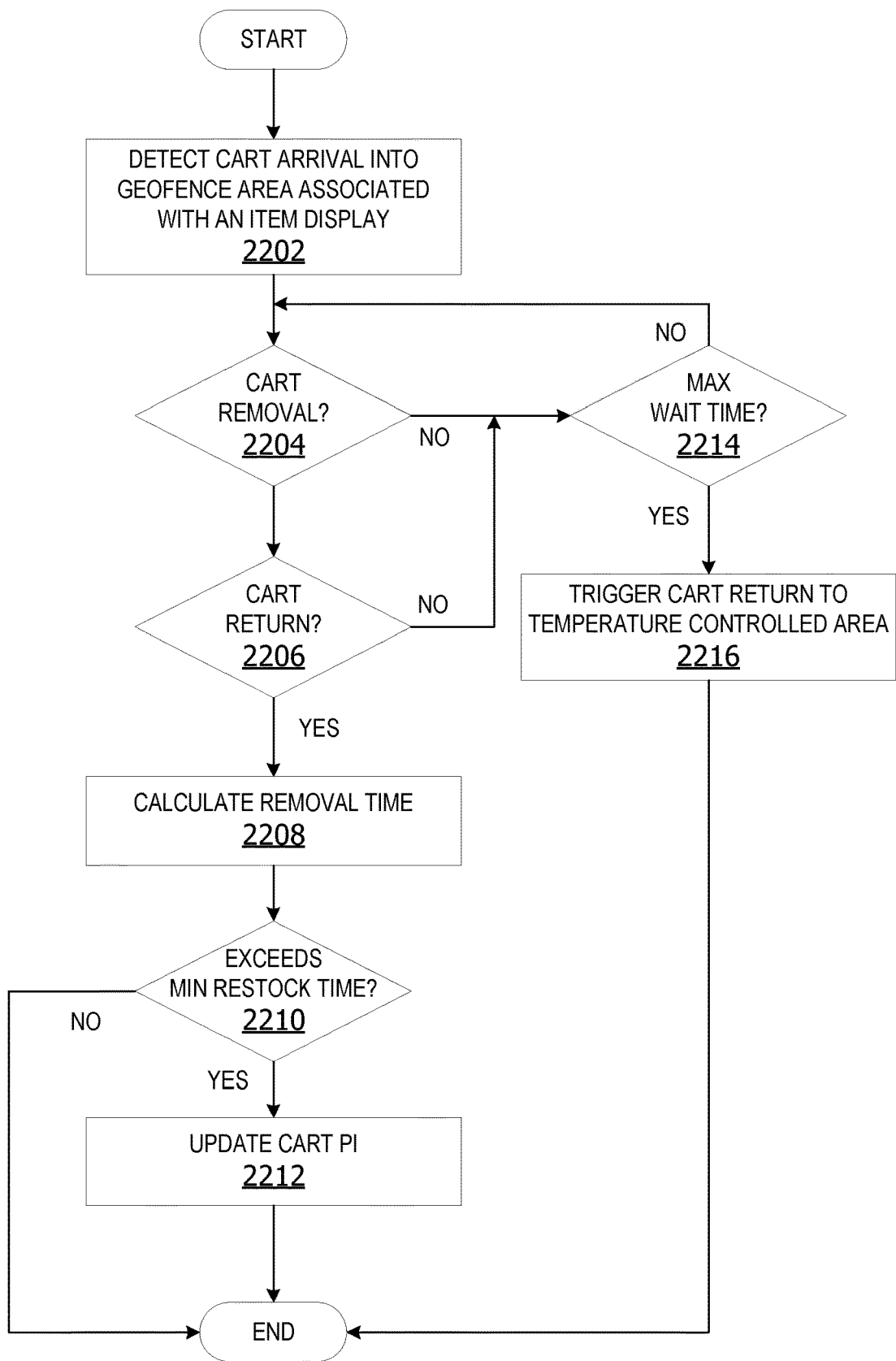
FIG. 22 is an exemplary flow chart illustrating operation of the computing device to manage cold-chain compliance and inventory updates associated with an item storage cart.

While the operations illustrated in FIG. 22 are performed by a computing device integrated into a smart item storage cart, aspects of the disclosure contemplate performance of the operations by other entities. For example, a cloud service may perform one or more of the operations.

FIG. 22 is an exemplary flow chart illustrating operation of the computing device to manage cold-chain compliance and inventory updates associated with an item storage cart. The process shown in FIG. 21 may be performed by a cart controller component, executing on a smart item storage cart, such as the smart item storage cart 102 in FIG. 1, FIG. 17 and/or FIG. 18.

The process begins by detecting a cart arrival into a geofence area associated with an item display at 2202. The cart controller component determines if the cart is removed from the geofence area at 2204. If yes, the cart controller component determines if the cart is returned to the geofence area at 2206. If yes, the cart controller component calculates a removal time at 2208. The removal time is the amount of time between removal of the cart from the geofence area and return of the cart back to the geofence area.

The cart controller component determines if the cart removal time exceeds a minimum restock time at 2210. If yes, the cart controller component updates a PI value for the cart at 2212. The process terminates thereafter.

If the cart is not removed from the geofence area, the cart controller component determines if the cart has remained in the geofence area for a maximum (MAX) wait time at 2214. If yes, the cart controller component triggers autonomous cart returns to a temperature-controlled area at 2216. The process terminates thereafter.

While the operations illustrated in FIG. 22 are performed by a computing device integrated into a smart item storage cart, aspects of the disclosure contemplate performance of the operations by other entities. For example, a cloud service may perform one or more of the operations.

Additional Examples

Some examples provide a cart to be used in a store which accommodates bins for storing, stocking and moving items, such as produce. The store system communicates with the cart to update orders and inventory records. This enables communication of perpetual inventory (PI) information and pick logic. The software/system enable the store to locate the cart in the store and determine the ability of the cart for stocking purposes. The cart includes a robotic propulsion system to move the cart under its own power to the proper location in the store for DC for stocking.

The cart with bins in other examples includes a light indicator, a digital readout, and/or an LED display for indicating the fill status of the cart. The indicator illuminates based on the amount of the cart that is currently filled. If all items in a bin are required for stocking a display, the entire indicator light illuminates on the bin indicator device. If half a display case needs to be filled, half of the lights are illuminated on the cart. The carts optionally include an optical sensor, a weight sensor and an off-gassing sensor. These sensors are used to indicate if the cart is empty or to detect spoilage of the items inside the cart. The carts have a unique IDs/serial numbers to determine the stocking preferences of the carts (FIFO/LIFO).

In an example scenario, a smart item storage cart for produce is provided. The produce cart includes bins for holding produce. The bins have lights (indicators). The cart communicates with a store inventory and/or a DC inventory, as well as picking/stocking software. The cart communicates with store systems to communicate PI info and pick logic. The cart aids users in stocking display cases as well as supply chain management.

In one non-limiting example, an empty item storage cart at a DC is selected. A picker scans the cart identifier and picks to it in a consistent, predetermined patter with an established starting point. The items are loaded onto the cart based on aisle location adjacencies in a destination store. The fully picked (loaded) cart is added to an invoice and loaded onto a truck with the carts stacked up to two carts high. Auto-finalization of the invoice occurs when the truck arrives. Using pick logic for replenishing display shelves, the bin indicators on bins containing items that need to be stocked are lit. The system evaluates sales, markdowns, PI changes, and sends signals to carts to illuminate indicators on bins for items to be stocked onto displays. At the end of the day, the system determines which items are remaining on which carts. The system identifies partially filled carts containing like items for consolidation of cart contents based on item categories and aisle location information (assigned display areas for items). When the carts are empty, the carts are scanned out as empty and returned to the DC for replenishment. When the DC receives the empty carts back, the DC refills the cart with items to be sent back to the store.

In some examples, when the cart is brought to the sales floor, the cart lights up an indicator associated with a bin storing the items that need to be stocked. If a full case needs to be stocked, a full light is illuminated. If a half case is going to be re-stocked, half of a light is illuminated. The cart location is tracked in the store. If the cart location is at the proper place for stocking, the system assumes the items needing stocking at that location were removed from the cart and added to the appropriate item display case/side-counter. The cart system automatically reduces the cart inventory container contents by the number of instances of the items designated for re-stocking. The system triggers a stocking order from backroom once a half case is needed for re-stock.

In other examples, the bin indicator device includes a digital readout of the number of instances of a selected item to stock. The cart may have a robotic propulsion system (self-navigation system) to autonomously move the cart to the proper location in a DC or store for stocking.

In an example scenario, a user scans an orange on the sales floor requesting thirty pounds of oranges for a large display of oranges. The system recognizes the outside-of-PI need for product. The system activates bin indicators on bins containing oranges for use in stocking the large display. In some cases, the carts containing oranges autonomously moves to the area near the display of oranges for utilization in creating/stocking the display.

If a store has multiple partially filled carts containing instances of the same item, the contents of two or more of these carts may be combined/consolidated. In other words, if there are two partially filled carts containing grapes, the contents of the two carts may be combined into a single cart. When the users are finished combining the carts contents, a new invoice is generated for each cart. The new invoices, indicating that one cart has been emptied and the other cart is now full, are assigned to the carts. In another example, a two partially filled item storage bins may be combined into a single full item storage bin if both bins contain the same items. The cart inventory is updated to reflect the updated contents of each bin.

An indicator device on a cart flashes or otherwise provides a notification indicating the cart has arrived at a destination (item display area). The indicator notifies the user that the cart has arrived at the appropriate location for restocking an item display.

A smart item storage cart knows the contents of each item storage bin on the cart. In some examples, when a user (picker) fills an item storage bin with produce, the user scans the cart identifier (serial number), the bin identifier, and/or the item identifier. The user loads items into each bin on the cart in a defined order. In some examples, the indicator lights up at the correct bin to be filled during pick operation at the DC. The user knows which items to put in which bin because the bin indicator for the correct bin lights up to indicate which bin the user should fill. The bin indicators light up in sequence as the user fills each bin to ensure the correct bins are filled with the correct items in the correct sequence. When the PI value for a given cart indicates the cart is empty, the system prompts for a manual verification. If a user verifies the cart is empty, the inventory value is confirmed. If the cart is not empty, the user manually updates the contents of the cart.

In one example, an item storage cart includes a location monitor to track cart location. When the cart leaves a temperature-controlled area, such as a truck or storage area, the cart starts a timer to track cart dwell-time. When the cart re-enters a temperature-controlled area, such as a cooler, the timer stops. The cart remains in the temperature-controlled area for a minimum in-cold time before the clock resets indicating it is safe to remove the cart from the temperature-controlled area again.

The smart item storage cart in other examples maintains a database of coefficients relating surface temperature to internal temperature for dwell-time determination to prevent item spoilage. These coefficients may be stored in the item file. This allows for a specific item to have an allowable out-of-cold-chain time, that is tailored to that item. For multiple items on the cart with different dwell-times, the cart is assigned the lowest dwell-time. For example, if oranges can be out of cold chain for one-hundred twenty minutes without risking spoilage, but apples may only be left out for twenty minutes, the maximum dwell-time for the cart is twenty minutes. The cart may remain out of cold chain for as long as the most sensitive item on the cart allows.

The cart may include a thermometer or infrared (IR) temperature reader that detects surface temperature of items on the cart. The sensors read the item temperature directly and/or the sensors may be mounted to a surface of the cart. If thermometers are applied to a metallic part of the cart, or other exposed section where temperature comes down rapidly, (higher coefficient of conductivity than the produce) a ratio of thermal conductivity of the cart structure to the produce in question is utilized to account for the different in temperature change.

In some examples, if the temperature of an item is outside an acceptable range, the indicator or notification component alerts the user that the item is no longer suitable for use/recommends disposal of the item. The cart may provide a specific visual identifier on a bin indicator for non-sellable items due to cold-chain violation. The bins are conceived to have lights indicating occupancy that illuminate in different colors for non-compliant items to-be-discarded. The cart updates central inventory via on board cart communications device so the PI is adjusted automatically. The contents of the bin are removed from available inventory for stocking.

In some examples, a plurality of item storage carts autonomously pre-stage in the proper location for efficient picking/loading of carts at beginning of the stocking shift. The cart contents are already assembled by store aisle location, each cart moves to the proper aisle location to prepare for stocking. The users do not need to retrieve individual carts or determine where items on the cart should be placed within the store. The carts are pre-staged autonomously. Upon completion of stocking, the carts automatically return themselves to the temperature-controlled area.

The cart continuously reports PI and places orders if a stocking order is placed and there are no suitable items available to stock the item displays. The cart adjusts store inventory and/or cart inventory if it determines items on the cart are voided/unsuitable due to cold chain. This triggers an order.

Each bin may include a camera array that captures images of items on the cart. The system uses known dimensions (item data), visual attributes in the item file, image data, item recognition analytics, and image data to estimate bin quantity and maintain accurate PI for each bin/cart. If a single item is spoiled or a portion of the items in a bin is discarded by the user, the system automatically updates the inventory without user intervention. User action is unnecessary for the system to adjust for discarded or non-compliant items removed from the cart.

In an example, the cart communicates with store image recognition software. The image recognition software identifies an absence of apples on an item display for apples. If apples are available on the cart, the cart automatically triggers restocking of the apple display using the apples from the cart. The cart circumvents the central database. A local stocking order is initiated by cart instead of a central inventory system based only on the lack of apples seen on camera and the existence of apples in the cart.

When an item storage cart is fully stocked at the DC, it is transported to a store ready to stock on the sales floor. The forklift channels enable a forklift to easily lift the carts for loading onto a truck. Once loaded onto a truck, the cart removes the contents of the cart from the DC inventory. When the cart arrives at the store, the cart updates the store's inventory to add the contents of the carts. Geofencing around the backroom (stock room) enables the cart to determine when the cart is leaving/entering the backroom. A user scans a cart identifier on the cart to retrieve an invoice for the cart. The invoice data provides an inventory of items on the cart. The invoice data specifies which item is in which bin. For example, a top bin may contain pears and a middle bin may contain apples.

The cart performs self-maintenance in some examples. For example, if the internal temperature measurements generated by temperature sensors on the cart do not match the internal temperature measurements generated by temperature sensors within refrigerated cases, the cart identifies a potential maintenance issue on the cart's sensors. Likewise, if the system is not receiving data from one or more sensors, the system identifies a maintenance issue.

Alternatively, or in addition to the other examples described herein, examples include any combination of the following:
  a set of forklift channels incorporated within the base member, the set of forklift channels configured to enclose a pair of forks on a forklift for the smart item storage cart to be loaded onto a transportation vehicle or unloaded off the transportation vehicle;
  a set of wheels attached to a bottom surface of the base member;
  a lip extending upward along an outer edge of the top member;
  a set of directional wheel locks associated with the set of wheels configured to the set of wheels in a four-out configuration for stacking a first item storage cart on top of a second item storage cart;
  a user interface device associated with the smart item storage cart configured to output a return cart notification to a user on condition a first per-cart wait time expires prior to removal of the smart storage cart from a non-temperature-controlled area within the item selection area;
  a user interface device associated with the smart item storage cart configured output an item disposal notification to a user on condition a second per-cart wait time expires prior to removal of the smart storage cart from a non-temperature-controlled area within the item selection area;
  a communications interface device associated with the smart item storage cart configured to output a return cart notification to a user device associated with a user on condition a per-cart wait time expires prior to removal of the smart storage cart from a non-temperature-controlled area within the item selection area;
  a set of sensor devices associated with the smart storage cart, the set of sensor devices comprising at least one of a set of temperature sensors, a set of weight sensors, a set of pressure sensors or a set of motion sensors;
  a set of sensor devices associated with the smart storage cart, the set of sensor devices comprising a set of image capture devices configured to generate images of contents of the at least one bin in the plurality of item storage bins for verification of contents of the at least one bin;
  a first side member comprising three vertical compartments enclosing three item storage bins arranged in a vertically stacked configuration; a second side member comprising three vertical compartments enclosing three item storage bins arranged in the vertically stacked configuration; a third side member comprising three vertical compartments enclosing three item storage bins arranged in the vertically stacked configuration; and a fourth side member comprising three vertical compartments enclosing three item storage bins arranged in the vertically stacked configuration;
  a set of wired connections connecting a power source to the bin restock indicator, wherein the set of wired connections runs from the vertical cavity through a horizontal channel to the bin restock indicator;
  a navigational system, wherein the navigation system autonomously returns the smart item storage cart to a temperature-controlled area on condition the smart item storage cart is located outside the temperature-controlled area for a per-cart threshold dwell time;
  a set of temperature sensors associated with the plurality of item storage bins, wherein the set of temperature sensors generate temperature data associated with an internal temperature of the stackable item storage cart;
  a user interface device configured to output a maintenance alert on condition the internal temperature is outside an acceptable threshold temperature range;

a communications interface device configured to output a return cart alert to a user device associated with a user via a network on condition the dwell-time exceeds the per-item maximum dwell;

a navigational system, wherein the navigation system autonomously returns the smart item storage cart to a geofence area within a temperature-controlled area on condition the dwell-time exceeds the first per-cart threshold dwell time;

a user interface device associated with the smart item storage cart configured to output a return cart notification to a user on condition a first per-cart wait time expires prior to removal of the smart storage cart from a non-temperature-controlled area within the item selection area and output an item disposal notification to a user on condition a second per-cart wait time expires prior to removal of the smart storage cart from a non-temperature-controlled area within the item selection area;

wherein the navigation system sends the self-propelled smart storage cart to a geofence area outside the temperature-controlled area on condition at least one item stored on the cart is selected for restocking at least one item display, wherein the self-propelled smart storage cart waits within the geofence area for the per-cart wait time;

wherein the navigation system returns the smart storage cart to the temperature-controlled area on condition the per-cart wait time expires prior to removal of the smart storage cart from the geofence area within a non-temperature-controlled area located within a proximity to at least one display area; and a set of sensor devices associated with the self-propelled smart storage cart, the set of sensor devices comprising at least one of image capture device, wherein the at least one image capture device generates image data associated with contents of at least one bin in the plurality of item storage bins to verify the contents of the at least one bin;

updating, by the update component, a value in PI associated with the selected item on condition the removal of the plurality of instances of the selected item is verified.

At least a portion of the functionality of the various elements in FIG. 1, FIG. 2, FIG. 3, FIG. 4, FIG. 5, FIG. 6, FIG. 7, FIG. 8, FIG. 9, FIG. 10, FIG. 11, FIG. 12, FIG. 13, FIG. 14, FIG. 15, FIG. 16, FIG. 17, FIG. 18, FIG. 19 and FIG. 20 may be performed by other elements in FIG. 1, FIG. 2, FIG. 3, FIG. 4, FIG. 5, FIG. 6, FIG. 7, FIG. 8, FIG. 9, FIG. 10, FIG. 11, FIG. 12, FIG. 13, FIG. 14, FIG. 15, FIG. 16, FIG. 17, FIG. 18, FIG. 19 and FIG. 20, or an entity (e.g., processor 106, web service, server, application program, computing device, etc.) not shown in FIG. 1, FIG. 2, FIG. 3, FIG. 4, FIG. 5, FIG. 6, FIG. 7, FIG. 8, FIG. 9, FIG. 10, FIG. 11, FIG. 12, FIG. 13, FIG. 14, FIG. 15, FIG. 16, FIG. 17, FIG. 18, FIG. 19 and FIG. 20.

In some examples, the operations illustrated in FIG. 21 and FIG. 22 may be implemented as software instructions encoded on a computer-readable medium, in hardware programmed or designed to perform the operations, or both. For example, aspects of the disclosure may be implemented as a system on a chip or other circuitry including a plurality of interconnected, electrically conductive elements.

While the aspects of the disclosure have been described in terms of various examples with their associated operations, a person skilled in the art would appreciate that a combination of operations from any number of different examples is also within scope of the aspects of the disclosure.

The term "Wi-Fi" as used herein refers, in some examples, to a wireless local area network using high frequency radio signals for the transmission of data. The term "BLUETOOTH®" as used herein refers, in some examples, to a wireless technology standard for exchanging data over short distances using short wavelength radio transmission. The term "cellular" as used herein refers, in some examples, to a wireless communication system using short-range radio stations that, when joined together, enable the transmission of data over a wide geographic area. The term "NFC" as used herein refers, in some examples, to a short-range high frequency wireless communication technology for the exchange of data over short distances.

Exemplary Operating Environment

Exemplary computer-readable media include flash memory drives, digital versatile discs (DVDs), compact discs (CDs), floppy disks, and tape cassettes. By way of example and not limitation, computer-readable media comprise computer storage media and communication media. Computer storage media include volatile and nonvolatile, removable and non-removable media implemented in any method or technology for storage of information such as computer-readable instructions, data structures, program modules and the like. Computer storage media are tangible and mutually exclusive to communication media. Computer storage media are implemented in hardware and exclude carrier waves and propagated signals. Computer storage media for purposes of this disclosure are not signals per se. Exemplary computer storage media include hard disks, flash drives, and other solid-state memory. In contrast, communication media typically embody computer-readable instructions, data structures, program modules, or the like, in a modulated data signal such as a carrier wave or other transport mechanism and include any information delivery media.

Although described in connection with an exemplary computing system environment, examples of the disclosure are capable of implementation with numerous other general purpose or special purpose computing system environments, configurations, or devices.

Examples of well-known computing systems, environments, and/or configurations that may be suitable for use with aspects of the disclosure include, but are not limited to, mobile computing devices, personal computers, server computers, hand-held or laptop devices, multiprocessor systems, gaming consoles, microprocessor-based systems, set top boxes, programmable consumer electronics, mobile telephones, mobile computing and/or communication devices in wearable or accessory form factors (e.g., watches, glasses, headsets, or earphones), network PCs, minicomputers, mainframe computers, distributed computing environments that include any of the above systems or devices, and the like. Such systems or devices may accept input from the user in any way, including from input devices such as a keyboard or pointing device, via gesture input, proximity input (such as by hovering), and/or via voice input.

Examples of the disclosure may be described in the general context of computer-executable instructions, such as program modules, executed by one or more computers or other devices in software, firmware, hardware, or a combination thereof. The computer-executable instructions may be organized into one or more computer-executable components or modules. Generally, program modules include, but are not limited to, routines, programs, objects, components, and data structures that perform tasks or implement abstract data types. Aspects of the disclosure may be implemented with any number and organization of such components or modules. For example, aspects of the disclosure are not limited to the specific computer-executable instructions or the specific components or modules illustrated in the figures and described herein. Other examples of the disclosure may include different computer-executable instructions or components having more functionality or less functionality than illustrated and described herein.

In examples involving a general-purpose computer, aspects of the disclosure transform the general-purpose computer into a special-purpose computing device when configured to execute the instructions described herein.

The examples illustrated and described herein as well as examples not specifically described herein but within the scope of aspects of the disclosure constitute exemplary means for providing cold-chain compliant item storage carts. For example, the elements illustrated in FIG. 1, FIG. 2, FIG. 3, FIG. 4, FIG. 5, FIG. 6, FIG. 7, FIG. 8, FIG. 9, FIG. 10, FIG. 11, FIG. 12, FIG. 13, FIG. 14, FIG. 15, FIG. 16, FIG. 17, FIG. 18, FIG. 19 and FIG. 20, such as when encoded to perform the operations illustrated in FIG. 21 and FIG. 22, constitute exemplary means for detecting an item storage cart exiting a temperature-controlled area within an item selection area via a cart location device associated with the smart storage cart; exemplary means for monitoring an actual dwell-time occurring between an exit time when the item storage cart exits the temperature-controlled area and a return time when the item storage cart returns to the temperature-controlled area; exemplary means for outputting a first alert recommending return of the item storage cart to the temperature-controlled area on condition of expiration of a first per-maximum dwell time prior to return of the item storage cart to the temperature-controlled area; exemplary means for outputting a second alert designating a set of items on the item storage cart for disposal on condition of expiration of a second per-cart dwell time prior to return of the item storage cart to the temperature-controlled storage area; and exemplary means for updating the PI on the data storage device to reflect removal of a plurality of instances of a selected item from at least one bin on the smart storage cart and placement of the plurality of instance of the selected item onto at least one display area assigned to the selected item on condition the smart storage cart is removed from the temperature-controlled area for a minimum threshold restocking time and returned to the temperature-controlled area within a maximum per-cart dwell time.

The order of execution or performance of the operations in examples of the disclosure illustrated and described herein is not essential, unless otherwise specified. That is, the operations may be performed in any order, unless otherwise specified, and examples of the disclosure may include additional or fewer operations than those disclosed herein. For example, it is contemplated that executing or performing an operation before, contemporaneously with, or after another operation is within the scope of aspects of the disclosure.

When introducing elements of aspects of the disclosure or the examples thereof, the articles "a," "an," "the," and "said" are intended to mean that there are one or more of the elements. The terms "comprising," "including," and "having" are intended to be inclusive and mean that there may be additional elements other than the listed elements. The term "exemplary" is intended to mean "an example of." The phrase "one or more of the following: A, B, and C" means "at least one of A and/or at least one of B and/or at least one of C."

Having described aspects of the disclosure in detail, it will be apparent that modifications and variations are possible without departing from the scope of aspects of the disclosure as defined in the appended claims. As various changes could be made in the above constructions, products, and methods without departing from the scope of aspects of the disclosure, it is intended that all matter contained in the above description and shown in the accompanying drawings shall be interpreted as illustrative and not in a limiting sense.

What is claimed is:

1. A smart item storage cart, the smart item storage cart comprising:
    a main body comprising a top member, a base member, a set of four side members; and a vertical cavity passing through a center of the main body enclosing a memory and at least one processor communicatively coupled to the memory;
    at least one horizontal compartment within the main body enclosing at least one item storage bin;
    a bin indicator device associated with the at least one item storage bin, the bin indicator device activating to indicate a quantity of the contents of the at least one item storage bin scheduled to be removed from the at least one item storage bin and placed on an item display in an item display area assigned to the at least one item in the at least one item storage bin;
    a data storage device storing an inventory of items located within the at least one item storage bin;
    a cart location device associated with the smart item storage cart identifying a location of the smart item storage cart within the item selection area;
    a timer device configured to monitor a dwell-time based on the location of the smart item storage cart, the dwell-time comprising an amount of time the smart item storage cart remains outside a temperature-controlled area;
    an output device that outputs a first alert recommending return of the stackable item storage cart to the temperature-controlled area on condition the dwell-time exceeds a first per-item maximum dwell-time;
    the output device that outputs a second alert recommending disposal of a set of items on the stackable item storage cart on condition the dwell-time exceeds a second per-item maximum dwell-time; and
    an update component, implemented on the at least one processor, that updates the inventory of items on the data storage device in response to addition of at least one item to the at least one item storage bin or removal of at least one item from the at least one item storage bin.

2. The smart item storage cart of claim 1, further comprising:
    a set of forklift channels incorporated within the base member, the set of forklift channels configured to enclose a pair of forks on a forklift for the smart item storage cart to be loaded onto a transportation vehicle or unloaded off the transportation vehicle.

3. The smart item storage cart of claim 1, further comprising:
    a set of wheels attached to a bottom surface of the base member;
    a lip extending upward along an outer edge of the top member; and
    a set of directional wheel locks associated with the set of wheels configured to the set of wheels in a four-out configuration for stacking a first item storage cart on top of a second item storage cart.

4. The smart item storage cart of claim 1, further comprising:
a user interface device associated with the smart item storage cart configured to output a return cart notification to a user on condition a first per-cart wait time expires prior to removal of the smart storage cart from a non-temperature-controlled area within the item selection area.

5. The smart item storage cart of claim 1, further comprising:
a user interface device associated with the smart item storage cart configured output an item disposal notification to a user on condition a second per-cart wait time expires prior to removal of the smart storage cart from a non-temperature-controlled area within the item selection area.

6. The smart item storage cart of claim 1, further comprising:
a communications interface device associated with the smart item storage cart configured to output a return cart notification to a user device associated with a user on condition a per-cart wait time expires prior to removal of the smart storage cart from a non-temperature-controlled area within the item selection area.

7. The smart item storage cart of claim 1, further comprising:
a set of sensor devices associated with the smart storage cart, the set of sensor devices comprising at least one of a set of temperature sensors, a set of weight sensors, a set of pressure sensors or a set of motion sensors.

8. The smart item storage cart of claim 1, further comprising:
a set of sensor devices associated with the smart storage cart, the set of sensor devices comprising a set of image capture devices configured to generate images of contents of the at least one bin in the plurality of item storage bins for verification of contents of the at least one bin.

9. The smart item storage cart of claim 1, wherein the set of four side members further comprises:
a first side member comprising three vertical compartments enclosing three item storage bins arranged in a vertically stacked configuration;
a second side member comprising three vertical compartments enclosing three item storage bins arranged in the vertically stacked configuration;
a third side member comprising three vertical compartments enclosing three item storage bins arranged in the vertically stacked configuration; and
a fourth side member comprising three vertical compartments enclosing three item storage bins arranged in the vertically stacked configuration.

10. The smart item storage cart of claim 1, further comprising:
a set of wired connections connecting a power source to the bin restock indicator, wherein the set of wired connections runs from the vertical cavity through a horizontal channel to the bin restock indicator.

11. The smart storage cart of claim 1, wherein the smart item storage cart is a self-propelled cart, and further comprising:
a navigational system, wherein the navigation system autonomously returns the smart item storage cart to a temperature-controlled area on condition the smart item storage cart is located outside the temperature-controlled area for a per-cart threshold dwell time.

12. A stackable item storage cart, the item storage cart comprising, the system comprising:
a main body comprising a top member, a base member, a set of side members; and a plurality of item storage bins;
a set of four wheels attached to a bottom surface of the base member;
a lip extending upward along an outer edge of the top member;
a set of directional wheel locks associated with the set of four wheels configured to lock the set of four wheels in a locked configuration for stacking a first item storage cart on top of a second item storage cart;
a set of bin indicator devices associated with each bin in the plurality of item storage bins, the bin indicator device activating to identify a quantity of items within a selected bin designated for removal from the stackable item storage cart for placement on an item display in an item display area assigned to the at least one item in the selected bin;
a power source located within a central cavity of the main body, the power source connected to each bin indicator device in the set of bin indicator device via a set of wires connecting the power source to the set of bin indicator devices;
a timer device configured to monitor a dwell-time the stackable item storage cart remains outside a temperature-controlled area; and
a user interface device configured to output a first alert recommending return of the stackable item storage cart to the temperature-controlled area on condition the dwell-time exceeds a first per-item maximum dwell-time and output a second alert recommending disposal of a set of items on the stackable item storage cart on condition the dwell-time exceeds a second per-item maximum dwell-time.

13. The stackable item storage cart of claim 12, further comprising:
a set of temperature sensors associated with the plurality of item storage bins, wherein the set of temperature sensors generate temperature data associated with an internal temperature of the stackable item storage cart; and
a user interface device configured to output a maintenance alert on condition the internal temperature is outside an acceptable threshold temperature range.

14. The stackable item storage cart of claim 12, further comprising:
a communications interface device configured to output a return cart alert to a user device associated with a user via a network on condition the dwell-time exceeds the per-item maximum dwell.

15. The stackable item storage cart of claim 12, wherein the smart item storage cart is a self-propelled cart, and further comprising:
a navigational system, wherein the navigation system autonomously returns the smart item storage cart to a geofence area within a temperature-controlled area on condition the dwell-time exceeds the first per-cart threshold dwell time.

16. A self-propelled item storage cart, the self-propelled item storage cart comprising:
a main body comprising a top member, a base member, a set of four side members; a plurality of item storage bins; and a vertical cavity passing through a center of the main body enclosing a memory and at least one processor communicatively coupled to the memory;

a plurality of bin indicator devices associated with the plurality of item storage bins, each bin indicator device associated with a corresponding item storage bin in the plurality of item storage bins, a bin indicator device activating to indicate a selected item storage bin, the plurality of bin indicator devices comprising at least one partial bin restock indicator associated with at least one bin in the plurality of item storage bins, the at least one bin comprising a plurality of instances of a selected item, the partial bin restock indicator identifying a quantity of the plurality of instances of the selected item to be removed from the at least one bin;

a power source located within a central cavity of the main body, the power source connected to each bin indicator device in the plurality of bin indicator devices via a set of wires connecting the power source to the set of bin indicator devices;

a motor coupled to a set of wheels associated with a bottom surface of the base member, the set of wheels comprising a braking system;

a timer device configured to monitor a dwell-time the stackable item storage cart remains outside a temperature-controlled area;

a user interface device configured to output a first alert recommending return of the stackable item storage cart to the temperature-controlled area on condition the dwell-time exceeds a first per-item maximum dwell-time and output a second alert recommending disposal of a set of items on the stackable item storage cart on condition the dwell-time exceeds a second per-item maximum dwell-time; and a navigational component implemented on the at least one processor, that autonomously returns the smart item storage cart to a temperature-controlled area on condition the smart item storage cart is located outside the temperature-controlled area for a per-cart threshold dwell time.

17. The self-propelled item storage cart of claim 16, further comprising:

a user interface device associated with the smart item storage cart configured to output a return cart notification to a user on condition a first per-cart wait time expires prior to removal of the smart storage cart from a non-temperature-controlled area within the item selection area and output an item disposal notification to a user on condition a second per-cart wait time expires prior to removal of the smart storage cart from a non-temperature-controlled area within the item selection area.

18. The self-propelled item storage cart of claim 16, wherein the navigation system sends the self-propelled smart storage cart to a geofence area outside the temperature-controlled area on condition at least one item stored on the cart is selected for restocking at least one item display, wherein the self-propelled smart storage cart waits within the geofence area for the per-cart wait time.

19. The self-propelled item storage cart of claim 16, wherein the navigation system returns the smart storage cart to the temperature-controlled area on condition the per-cart wait time expires prior to removal of the smart storage cart from the geofence area within a non-temperature-controlled area located within a proximity to at least one display area.

20. The self-propelled item storage cart of claim 16, further comprising:

a set of sensor devices associated with the self-propelled smart storage cart, the set of sensor devices comprising at least one of image capture device, wherein the at least one image capture device generates image data associated with contents of at least one bin in the plurality of item storage bins to verify the contents of the at least one bin.

* * * * *